(12) United States Patent
Patel et al.

(10) Patent No.: US 11,895,193 B2
(45) Date of Patent: Feb. 6, 2024

(54) DATA CENTER RESOURCE MONITORING WITH MANAGED MESSAGE LOAD BALANCING WITH REORDERING CONSIDERATION

(71) Applicant: Juniper Networks, Inc., Sunnyvale, CA (US)

(72) Inventors: Rajenkumar Patel, Sunnyvale, CA (US); Harshit Naresh Chitalia, Mountain View, CA (US); Tarun Banka, Milpitas, CA (US); Mithun Chakaravarrti Dharmaraj, Mountain View, CA (US); Gauresh Dilip Vanjare, Santa Clara, CA (US); Yixiao Wei, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/947,139

(22) Filed: Jul. 20, 2020

(65) Prior Publication Data

US 2022/0021738 A1 Jan. 20, 2022

(51) Int. Cl.
*H04L 67/14* (2022.01)
*H04L 67/1001* (2022.01)
(Continued)

(52) U.S. Cl.
CPC .............. *H04L 67/14* (2013.01); *G06F 9/546* (2013.01); *H04L 43/04* (2013.01); *H04L 67/1001* (2022.05); *H04L 69/329* (2013.01)

(58) Field of Classification Search
CPC ....... H04L 67/14; H04L 43/04; H04L 69/329; H04L 67/1002; H04L 41/0213;
(Continued)

(56) References Cited

U.S. PATENT DOCUMENTS 9,641,435 B1 5/2017 Sivaramakrishnan
10,624,148 B1 * 4/2020 Bainbridge ........... H04W 76/25
(Continued)

FOREIGN PATENT DOCUMENTS

EP 3672169 A1 6/2020
WO 2013184846 A1 12/2013

OTHER PUBLICATIONS

Extended Search Report from counterpart European Application No. 20201318.1, dated Apr. 1, 2021, 8 pp.
(Continued)

*Primary Examiner* — Soe Hlaing
(74) *Attorney, Agent, or Firm* — Shumaker & Sieffert, P.A.

(57) ABSTRACT

Techniques for resource monitoring and managed message reordering in a data center are described. In one example, a computing system comprises an ingress engine to receive a message from a network device in a data center comprising a plurality of network devices and the computing system; and in response to receiving the message from a network device in the data center, communicate the message to an appropriate collector application corresponding to the message's protocol type in compliance with at least one requirement for data stored in a message flow communicated from one or more network devices to the computing system.

20 Claims, 8 Drawing Sheets

(51) Int. Cl.
*H04L 43/04* (2022.01)
*H04L 69/329* (2022.01)
*G06F 9/54* (2006.01)

(58) Field of Classification Search
CPC . H04L 41/046; H04L 41/145; H04L 41/0893; H04L 41/142; H04L 43/0876; H04L 43/10; H04L 67/327; H04L 67/63; H04L 67/1001; H04L 41/0894; H04L 41/40; H04L 43/20; G06F 9/546; G06F 9/45533; G06F 9/45558; G06F 9/4881; G06F 9/5083; G06F 11/301; G06F 11/3051; G06F 2009/45591
See application file for complete search history.

(56) References Cited

U.S. PATENT DOCUMENTS

| | | | |
|---|---|---|---|
| 2003/0195919 A1 | 10/2003 | Watanuki et al. | |
| 2006/0253725 A1* | 11/2006 | Chen | G06F 11/2025 714/47.1 |
| 2011/0113251 A1* | 5/2011 | Lu | H04L 63/061 713/172 |
| 2011/0314165 A1* | 12/2011 | Maes | H04L 67/148 709/227 |
| 2014/0052841 A1* | 2/2014 | Kanemasa | G06F 11/3419 709/224 |
| 2014/0180982 A1* | 6/2014 | Murphy | G06N 5/04 706/14 |
| 2014/0280792 A1* | 9/2014 | Sigoure | H04L 41/0654 709/224 |
| 2015/0098465 A1* | 4/2015 | Caputo, II | H04L 69/22 370/389 |
| 2015/0339388 A1* | 11/2015 | Carlson | H04Q 9/00 707/722 |
| 2016/0088022 A1* | 3/2016 | Handa | H04L 67/2823 726/1 |
| 2018/0063195 A1* | 3/2018 | Nimmagadda | H04L 63/0263 |
| 2018/0285750 A1* | 10/2018 | Purushothaman | G06N 20/00 |
| 2020/0245106 A1* | 7/2020 | Cao | H04L 61/103 |
| 2021/0099495 A1* | 4/2021 | Khanna | H04L 63/205 |
| 2021/0160275 A1* | 5/2021 | Anderson | H04L 63/1458 |

OTHER PUBLICATIONS

Response to Extended Search Report dated Jan. 31, 2022, from counterpart European Application No. 202013818.1, filed Jul. 26, 2022, 25 pp.

Notice of Intent to Grant and Text Intended to Grant from counterpart European Application No. 202013818.1 dated May 25, 2023, 56 pp.

* cited by examiner

DATA CENTER RESOURCE MONITORING WITH MANAGED MESSAGE LOAD BALANCING WITH REORDERING CONSIDERATION

TECHNICAL FIELD

The disclosure relates to monitoring and improving performance of cloud data centers and networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

Some data centers include mechanisms for monitoring resources within a data center, gathering various data including statistics measuring data center performance, and then, using the gathered data to support the management of virtualized networking infrastructure. As the number of objects on the network and the metrics they generate have grown, data centers cannot rely on traditional mechanisms for monitoring data center resources, for example, regarding health of a network and any potential risks. These mechanisms have imposed limits on network element scale, availability, efficiency, and often require additional processing, for example, to periodically poll the network element directly.

SUMMARY

This disclosure describes techniques for monitoring, scheduling, and performance management for computing environments, such as virtualization infrastructures deployed within data centers. The techniques provide visibility into operational performance and infrastructure resources. As described herein, the techniques may leverage analytics in a distributed architecture to provide near or seemingly-near real-time and historic monitoring, performance visibility and dynamic optimization to improve orchestration, security, accounting and planning within the computing environment. The techniques may provide advantages within, for example, hybrid, private, or public enterprise cloud environments. The techniques accommodate a variety of virtualization mechanisms, such as containers and virtual machines, to support multi-tenant, dynamic, and constantly evolving enterprise clouds.

Aspects of this disclosure generally describe techniques and systems for maintaining viability of various data captured while monitoring network infrastructure elements and other resources in any example data center. These techniques and systems rely on a policy corresponding to the captured data's protocol type to determine how to manage (e.g., properly communicate) messages transporting the captured data. According to one example policy, some protocol types require a proper ordering of the messages at a destination server; any deviation from the proper ordering may prevent the messages' stored data from being a viable dataset for the performance visibility and dynamic optimization to improve orchestration, security, accounting and planning within the computing environment. Techniques and systems that differ from the present disclosure do not rely upon such a policy and therefore, any message arriving out-of-order or at a destination server without an appropriate collector application may render unusable or invalid the messages' stored data, disrupting the management of network infrastructure.

In general, policy enforcement as described herein refers to satisfying one or more requirements for stored message data (e.g., the captured telemetry data) to be a viable dataset in accordance with the messages' telemetry protocol type. Examples of policy enforcement may involve any combination of the following: modifying the captured telemetry data's structure or the telemetry data itself, providing scalability via load balancing, high availability, and/or auto-scaling, identifying an appropriate collector application corresponding to the telemetry protocol type, and/or the like.

In an example computing system, an example ingress engine performs policy enforcement on incoming messages, ensuring that stored message data complies with each corresponding policy based upon the messages' protocol type. One example policy prescribes one or more requirements for the above-mentioned captured telemetry data such that if each requirement is met, the captured telemetry data may be extracted from the messages, assembled into a viable dataset, and then, processed for network infrastructure monitoring and management processes. Having these messages satisfy their corresponding policy requirements enables one or more applications running at the destination server to collect and successfully analyze the captured telemetry data for meaningful information (e.g., a health or risk assessment) regarding data center resources. Instances where an out-of-order or missing message causes disruptions in the data center are (for the most part) mitigated or eliminated altogether. For this reason and for additional reasons describe herein, the present disclosure provides a technological improvement in computer networking and a practical application of a technical solution to problems handling messages of different computer networking protocol types.

In one example, a method includes: receiving, by an ingress engine running on processing circuitry of a computing system, a message from a network device in a data center comprising a plurality of network devices and the computing system; and in response to receiving a message from a network device in the data center, communicating, by the ingress engine, the message to an appropriate collector application corresponding to the message's protocol type in compliance with at least one requirement for data stored in messages communicated from the plurality of network devices to the computing system.

In another example, a computing system includes: a memory; and processing circuitry in communication with the memory, the processing circuitry configured to execute logic comprising an ingress engine configured to: receive a message from a network device in a data center comprising a plurality of network devices and the computing system; and in response to receiving the message from a network device in the data center, communicate the message to an appropriate collector application corresponding to the message's protocol type in compliance with at least one requirement for data stored in a message flow communicated from one or more network devices to the computing system.

In another example, a computer-readable medium comprising instructions for causing a programmable processor to: receive, by an ingress engine running on processing circuitry of a computing system, a message from a network device in a data center comprising a plurality of network devices and the computing system; and in response to receiving the message from a network device in the data center, communicate the message to an appropriate collector application corresponding to the message's protocol type in compliance with at least one requirement for data stored in a message flow communicated from one or more network devices to the computing system.

The details of one or more examples are set forth in the accompanying drawings and the description below. Other features, objects, and advantages will be apparent from the description and drawings, and from the claims.

DETAILED DESCRIPTION

Figure 1:
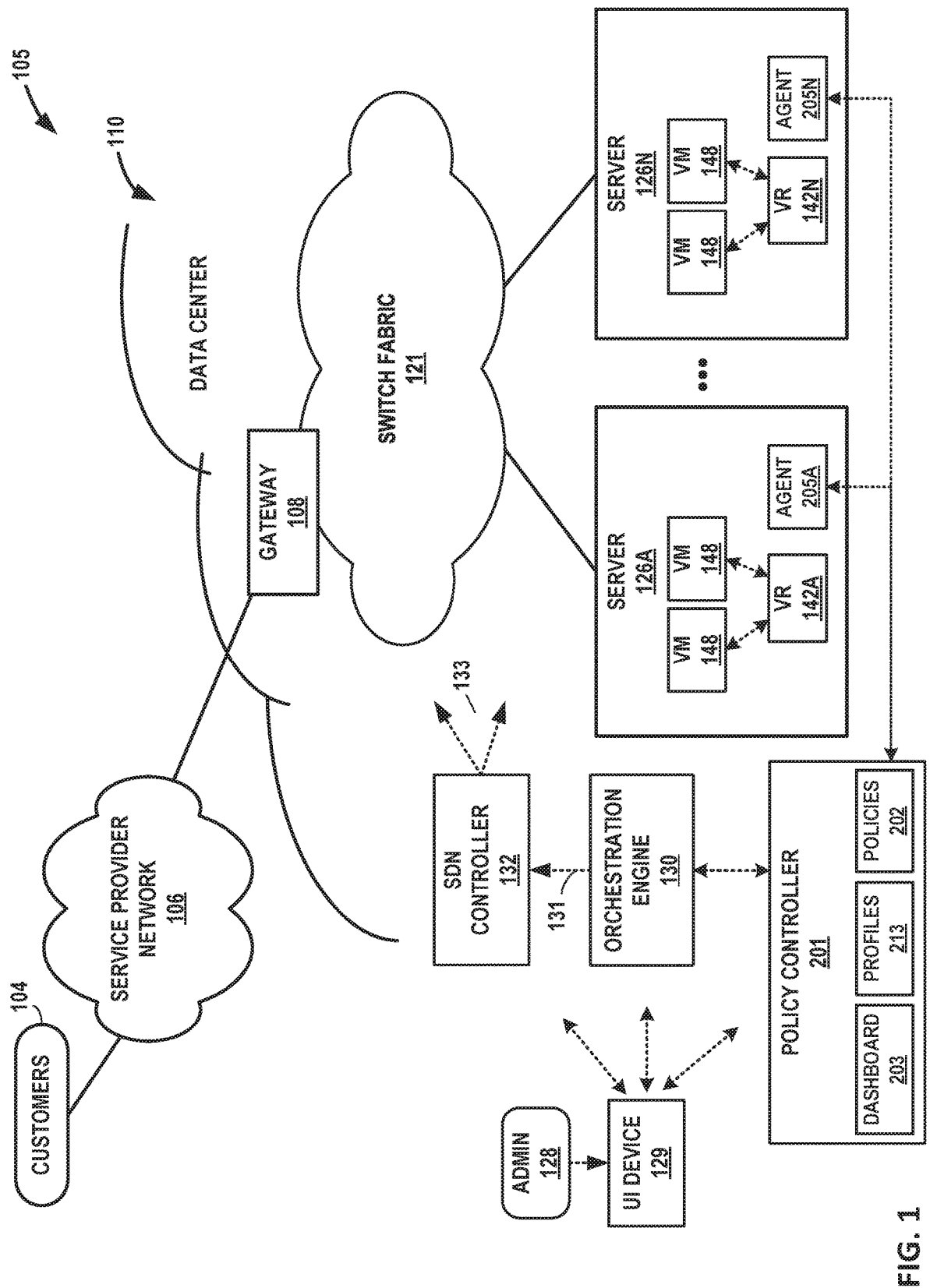
FIG. 1 is a conceptual diagram illustrating an example network that includes an example data center in which resources are monitored with managed message load balancing with reordering consideration, in accordance with one or more aspects of the present disclosure.

As described herein, a data center may deploy various network infrastructure resource monitoring/management mechanisms of which some operate differently from others. Some implement specific protocol types through which various data may be captured at network device-level and then, communicated to a set of dedicated computing systems (e.g., servers forming a cluster which may be known herein as analytics cluster) for processing. To successfully analyze the data from network devices, the data center may establish policies having different requirements for computing systems to follow in order to ensure a successful analysis of data for any protocol type. The data may be communicated as messages and then, extracted for the analysis; however, policy non-compliance often results in a failed analysis.

Examples reasons for the failed analysis include dropped or corrupted messages, messages arriving out-of-order, messages having incorrect metadata (e.g., in a message header), messages having incorrectly formatted data, and/or the like. Each message protocol type's data model may require compliance with a unique set of requirements. Conventionally, analytics clusters within data centers are unable to ensure compliance of requirements corresponding to any protocol type of relevant message data.

To overcome these and other limitations, the present disclosure describes techniques that ensure the compliance with the unique set of requirements of any given message protocol type. Protocol types (e.g., telemetry protocols) based on the UDP transport protocol do not employ sequence numbers to maintain an ordering of a message flow, which may cause difficulties when processing out-of-order messages. Collector applications for some protocol types cannot use out-of-order messages (e.g., because of dependencies between messages in a same message flow) and thus, require that at least some messages belonging to the same message flow arrive in sequence or time order. However, these collector application cannot rely upon any known Network Functions Virtualization infrastructure (NFVi) mechanism for reordering. Because no reordering mechanism exists or because some messages are dropped or split between multiple nodes, a collector application in accordance with one or more protocol types may require all the message data and thus, a corresponding policy may set forth a requirement that a same collector application receive each message of the message flow. Other protocol types may implement a data model that is unaffected by out-of-order messages. In such a data model, the data stored in one message is not dependent upon another message's stored data. A corresponding policy for the other protocol types may require multiple collector applications processing different messages (e.g., in parallel). Hence, one requirement in any policy described herein is the identification of an appropriate application to receive each message of the message flow based upon the message protocol type/data model's tolerance for reordering.

Another policy may require persistence of specific message attributes (e.g., source information) in the message header (e.g., conforming message metadata to the protocol type's data model); otherwise, those attributes may be overwritten, causing the failed analysis. Compliance with this requirement enables a compatible collector application to properly extract the message metadata and then, properly analyze the message payload data. One example technique to rectify any non-compliance may modify the message metadata and/or the message protocol type's policy. Once the non-compliance is resolved, the message may be communicated to the appropriate collector application.

Some of the techniques and systems described herein that enable policy enforcement via verification of telemetry data being stored and transported in message form. An example policy may codify requirements for the telemetry data to be viable for the analytics in the distributed architecture of the data center. The telemetry data generated by sensors, agents, devices, and/or the like in the data center may be communicated to one or more dedicated destination servers in message form. In these servers, various applications analyze the telemetry data stored in each message and obtain measurements, statistics, or some other meaningful information for assessing an operational state (e.g., health/risk) of resources in the data center. Further analysis of the telemetry data may yield meaningful information for other tasks related to managing the network infrastructure and other resources in the data center.

For a cluster of computing systems operating as destination servers for messages transporting telemetry data from network devices in the data center, at least one dedicated server (e.g., a management computing system) is communicably coupled to the cluster of computing systems and operates as an intermediary destination and access point for the messages to be monitored. That dedicated server may include a Software-Defined Network (SDN) controller to perform services for other servers in the cluster, such as operating a policy controller in the data center, configuring ingress engines in the destination servers to enforce requirements for the telemetry data to be viable, operating a load balancing mechanism to distribute compatible collector applications for the protocol type(s) of the messages transporting the telemetry data, and distributing messages amongst the destination servers according to. Because the load balancing mechanism does not take into account a message's protocol type when distributing that message to a destination server, it is possible to communicate the message to a destination server without an appropriate collector application corresponding to the message's protocol type in compliance with the requirements for the telemetry data to be viable. To communicate a message in compliance with message protocol type's requirements, the ingress engines identifies an appropriate collector application to receive the message corresponding to upon the message's protocol type.

Another aspect of network infrastructure resource monitoring/management in a data center is performance management, which includes load balancing. In a typical deployment, the network element, or device, streams data to at least one destination server that functions as a performance management system micro-service provider. The streamed data may include telemetry data such as physical interface statistics, firewall filter counter statistics, label-switched path (LSP) statistics. Through sensors employing UDP to export relevant data from a source network device, such as the line card or network processing unit (NPU), the relevant data arrives as messages via a data port on the at least one destination server. In turn, a properly configured ingress engine running at one destination server performs policy enforcement as described herein.

FIG. 1 is a conceptual diagram illustrating an example network 105 that includes an example data center 110 in which performance and usage metrics for infrastructure elements for cloud-based computing environments are monitored, and optionally including internal processor metrics relating to resources shared by multiple processes, in accordance with one or more aspects of the present disclosure. FIG. 1 illustrates one example implementation of network 105 and data center 110 that hosts one or more cloud-based computing networks, computing domains or projects, generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network 105 and data center 110 may be appropriate in other instances. Such implementations may include a subset of the components included in the example of FIG. 1 and/or may include additional components not shown in FIG. 1.

In the example of FIG. 1, data center 110 provides an operating environment for applications and services for customers 104 coupled to data center 110 by service provider network 106. Although functions and operations described in connection with network 105 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 110 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 110 may represent one of many geographically distributed network data centers. As illustrated in the example of FIG. 1, data center 110 is a facility that provides network services for customers 104. Customers 104 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 110 is an individual network server, a network peer, or otherwise.

In the example of FIG. 1, data center 110 includes a set of storage systems and application servers, including server 126A through server 126N (collectively "servers 126") interconnected via high-speed switch fabric 121 provided by one or more tiers of physical network switches and routers. Servers 126 function as physical compute nodes of the data center. For example, each of servers 126 may provide an operating environment for execution of one or more customer-specific virtual machines 148 ("VMs" in FIG. 1) or other virtualized instances, such as containers. Each of servers 126 may be alternatively referred to as a host computing device or, more simply, as a host. A server 126 may execute one or more virtualized instances, such as virtual machines, containers, or other virtual execution environment for running one or more services, such as virtualized network functions (VNFs).

Although not shown, switch fabric 121 may include top-of-rack (TOR) switches coupled to a distribution layer of chassis switches, and data center 110 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 110 and customers 104 by service provider network 106. Gateway 108 acts to forward and receive packets between switch fabric 121 and service provider network 106.

Software-Defined Networking ("SDN") controller 132 provides a logically and in some cases physically centralized controller for facilitating operation of one or more virtual networks within data center 110 in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via northbound API 131, which in turn operates in response to configuration input received from an administrator 128 interacting with and/or operating user interface device 129. Additional information regarding SDN controller 132 operating in conjunction with other devices of data center 110 or other software-defined network is found in International Application Number PCT/US 2013/044378, filed Jun. 5, 2013, and entitled PHYSICAL PATH DETERMINATION FOR VIRTUAL NETWORK PACKET FLOWS, which is incorporated by reference as if fully set forth herein.

User interface device 129 may be implemented as any suitable device for interacting presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than policy controller 201. In such examples, user interface device 129 may communicate with policy controller 201 over a network or other means of communication. In other examples, user interface device 129 may be a local peripheral of policy controller 201, or may be integrated into policy controller 201.

In some examples, orchestration engine 130 manages functions of data center 110 such as compute, storage, networking, and application resources. For example, orchestration engine 130 may create a virtual network for a tenant within data center 110 or across data centers. Orchestration engine 130 may attach virtual machines (VMs) to a tenant's virtual network. Orchestration engine 130 may connect a tenant's virtual network to an external network, e.g. the Internet or a VPN. Orchestration engine 130 may implement a security policy across a group of VMs or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 126 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches, chassis switches, and switch fabric 121; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 121 or between servers 126 and customers 104 or between servers 126, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Virtual routers 142 (virtual router 142A to virtual router 142N, collectively "virtual routers 142" in FIG. 1) execute multiple routing instances for corresponding virtual networks within data center 110 and routes the packets to appropriate virtual machines executing within the operating environment provided by servers 126. Each of servers 126 may include a virtual router. Packets received by virtual router 142A of server 126A, for instance, from the underlying physical network fabric may include an outer header to allow the physical network fabric to tunnel the payload or "inner packet" to a physical network address for a network interface of server 126A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 126 may receive inbound tunnel packets of a packet flow from one or more TOR switches within switch fabric 121 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 126 are described in U.S. patent application Ser. No. 14/228,844, entitled "PACKET SEGMENTATION OFFLOAD FOR VIRTUAL NETWORKS," incorporated herein by reference.

In some example implementations, virtual routers 142 executing on servers 126 steer received inbound tunnel packets among multiple processor cores to facilitate packet processing load balancing among the cores when processing the packets for routing to one or more virtual and/or physical machines. As one example, server 126A includes multiple network interface cards and multiple processor cores to execute virtual router 142A and steers received packets among multiple processor cores to facilitate packet processing load balancing among the cores. For instance, a particular network interface card of server 126A may be associated with a designated processor core to which the network interface card directs all received packets. The various processor cores, rather than processing each of the received packets, offloads flows to one or more other processor cores, in accordance with a hash function applied to at least one of the inner and outer packet headers, for processing to take advantage of available work cycles of the other processor cores.

In the example of FIG. 1, data center 110 further includes a policy controller 201 that provides monitoring, scheduling, and performance management for data center 110. Policy controller 201 interacts with monitoring agents 205 that are deployed within at least some of the respective physical servers 216 for monitoring resource usage of the physical compute nodes as well as any virtualized host, such as VM 148, executing on the physical host. In this way, monitoring agents 205 provide distributed mechanisms for collecting a wide variety of usage metrics as well as for local enforcement of policies installed by policy controller 201. In example implementations, monitoring agents 205 run on the lowest level "compute nodes" of the infrastructure of data center 110 that provide computational resources to execute application workload. A compute node may, for example, be a bare-metal host of server 126, a virtual machine 148, a container or the like.

Policy controller 201 obtains the usage metrics from monitoring agents 205 and constructs a dashboard 203 (e.g., a set of user interfaces) to provide visibility into operational performance and infrastructure resources of data center 110. Policy controller 201 may, for example, communicate dashboard 203 to UI device 129 for display to administrator 128. In addition, policy controller 201 may apply analytics and machine learning to the collected metrics to provide near or seemingly near real-time and historic monitoring, performance visibility and dynamic optimization to improve orchestration, security, accounting and planning within data center 110.

As shown in the example of FIG. 1, Policy controller 201 may define and maintain a rule base as a set of policies 202. Policy controller 201 may administer control of each of servers 126 based on the set of policies 202 policy controller 201. Policies 202 may be created or derived in response to input by administrator 128 or in response to operations performed by policy controller 201. Policy controller 201 may, for example, observe operation of data center 110 over time and apply machine learning techniques to generate one or more policies 202. Policy controller 201 may periodically, occasionally, or continually refine policies 202 as further observations about data center 110 are made.

Policy controller 201 (e.g., an analytics engine within policy controller 201) may determine how policies are deployed, implemented, and/or triggered at one or more of servers 126. For instance, policy controller 201 may be configured to push one or more policies 202 to one or more of the policy agents 205 executing on servers 126. Policy controller 201 may receive information about internal processor metrics from one or more of policy agents 205, and determine if conditions of a rule for the one or more metrics are met.

Policy controller 201 may analyze the internal processor metrics received from policy agents 205, and based on the analysis, instruct or cause one or more policy agents 205 to perform one or more actions to modify the operation of the server associated with a policy agent.

In some examples, policy controller 201 may be configured to determine and/or identify elements in the form of the virtual machines, containers, services, and/or applications executing on each of servers 126. As used herein, a resource generally refers to a consumable component of the virtualization infrastructure, i.e., a component that is used by the infrastructure, such as CPUs, memory, disk, disk I/O, network I/O, virtual CPUs, and Contrail vRouters. A resource may have one or more characteristics each associated with a metric that is analyzed by the policy agent 205 (and/or policy controller 201) and optionally reported. Lists of example raw metrics for resources are described below with respect to FIG. 2.

In general, an infrastructure element, also referred to herein as an element, is a component of the infrastructure that includes or consumes consumable resources in order to operate. Example elements include hosts, physical or virtual network devices, instances (e.g., virtual machines, containers, or other virtual operating environment instances), aggregates, projects, and services. In some cases, an element may be a resource for another element. Virtual network devices may include, e.g., virtual routers and switches, vRouters, vSwitches, Open Virtual Switches, and Virtual Tunnel Forwarders (VTFs). A metric is a value that measures the amount of a resource, for a characteristic of the resource, that is consumed by an element.

Policy controller 201 may also analyze internal processor metrics received from policy agents 205, and classify one or more virtual machines 148 based on the extent to which each virtual machine uses shared resources of servers 126 (e.g., classifications could be CPU-bound, cache-bound, memory-bound). Policy controller 201 may interact with orchestration engine 130 to cause orchestration engine 130 to adjust, based on the classifications of virtual machines 148 executing on servers 126, the deployment of one or more virtual machines 148 on servers 126.

Policy controller 201 may be further configured to report information about whether the conditions of a rule are met to a client interface associated with user interface device 129. Alternatively, or in addition, policy controller 201 may be further configured to report information about whether the conditions of a rule are met to one or more policy agents 205 and/or orchestration engine 130.

Policy controller 201 may be implemented as or within any suitable computing device, or across multiple computing devices. Policy controller 201, or components of policy controller 201, may be implemented as one or more modules of a computing device. In some examples, policy controller 201 may include a number of modules executing on a class of compute nodes (e.g., "infrastructure nodes") included within data center 110. Such nodes may be OpenStack infrastructure service nodes or Kubernetes master nodes, and/or may be implemented as virtual machines. In some examples, policy controller 201 may have network connectivity to some or all other compute nodes within data center 110, and may also have network connectivity to other infrastructure services that manage data center 110.

One or more policies 202 may include instructions to cause one or more policy agents 205 to monitor one or more metrics associated with servers 126. One or more policies 202 may include instructions to cause one or more policy agents 205 to analyze one or more metrics associated with servers 126 to determine whether the conditions of a rule are met. One or more policies 202 may alternatively, or in addition, include instructions to cause policy agents 205 to report one or more metrics to policy controller 201, including whether those metrics satisfy the conditions of a rule associated with one or more policies 202. The reported information may include raw data, summary data, and sampling data as specified or required by one or more policies 202.

Dashboard 203 may, in some examples, be considered a collection of collection of user interfaces presenting information about metrics, alarms, notifications, reports, and other information about data center 110. Dashboard 203 may include one or more user interfaces that are presented by user interface device 129. Dashboard 203 may be created, updated, and/or maintained primarily by policy controller 201 or by a dashboard module executing on policy controller 201. In some examples, dashboard 203 may be created, updated, and/or maintained primarily by a dashboard module executing on policy controller 201. Dashboard 203 and an associated dashboard module may be collectively implemented through a software object instantiated in memory having associated data and/or executable software instructions that provide output data for rendering on a display. Throughout this specification, reference may be made to dashboard 203 performing one or more functions, and in such cases, dashboard 203 refers to both a dashboard module and a collection of dashboard user interfaces and related data.

User interface device 129 may detect interactions with user interfaces from dashboard 203 as user input (e.g., from administrator 128). Policy controller may, in response to user interactions with dashboard 203, cause configurations to be made to aspects of data center 110 or projects executing on one or more virtual machines 148 of data center 110 relating to network resources, data transfer limitations or costs, storage limitations or costs, and/or accounting reports.

Dashboard 203 may include a graphical view that provides a quick, visual overview of resource utilization by instance using histograms. The bins of such histograms may represent the number of instances that used a given percentage of a resource, such CPU utilization. By presenting data using histograms, dashboard 203 presents information in a way that allows administrator 128, if dashboard 203 is presented at user interface device 129, to quickly identify patterns that indicate under-provisioned or over-provisioned instances. In some examples, dashboard 203 may highlight resource utilization by instances on a particular project or host, or total resource utilization across all hosts or projects, so that administrator 128 may understand the resource utilization in context of the entire infrastructure.

Dashboard 203 may include information relating to costs for use of compute, network, and/or storage resources, as well as costs incurred by a project. Dashboard 203 may also present information about the health and risk for one or more virtual machines 148 or other resources within data center 110. In some examples, "health" may correspond to an indicator that reflects a current state of one or more virtual machines 148. For example, an example virtual machine that exhibits a health problem may be currently operating outside of user-specified performance policy. "Risk" may correspond to an indicator that reflects a predicted future state of one or more virtual machines 148, such that an example virtual machine that exhibits a risk problem may be unhealthy in the future. Health and risk indicators may be determined based on monitored metrics and/or alarms corresponding to those metrics. For example, if policy agent 205 is not receiving heartbeats from a host, then policy agent 205 may characterize that host and all of its instances as unhealthy. Policy controller 201 may update dashboard 203 to reflect the health of the relevant hosts, and may indicate that reason for the unhealthy state is one or more "missed heartbeats."

One or more policy agents 205 may execute on one or more of servers 126 to monitor some or all of the performance metrics associated with servers 126 and/or virtual machines 148 executing on servers 126. Policy agents 205 may analyze monitored information and/or metrics and generate operational information and/or intelligence associated with an operational state of servers 126 and/or one or more virtual machines 148 executing on such servers 126. Policy agents 205 may interact with a kernel operating on one or more servers 126 to determine, extract, or receive internal processor metrics associated with use of shared resources by one or more processes and/or virtual machines 148 executing at servers 126. Policy agents 205 may perform monitoring and analysis locally at each of servers 126. In some examples, policy agents 205 may perform monitoring and/or analysis in a near and/or seemingly real-time manner.

In the example of FIG. 1, and in accordance with one or more aspects of the present disclosure, policy agents 205 may monitor servers 126. For example, policy agent 205A of server 126A may interact with components, modules, or other elements of server 126A and/or one or more virtual machines 148 executing on servers 126. Policy agent 205A may, as a result of such interactions, collect information about one or more metrics associated with servers 126 and/or virtual machines 148. Such metrics may be raw metrics, which may be based directly or read directly from servers 126, virtual machines 148, and/or other components of data center 110; such metrics may alternatively, or in addition, be SNMP metrics and/or telemetry-based metrics. In some examples, one or more of such metrics may be calculated metrics, which include those derived from raw metrics. In some examples, metrics may correspond to a percentage of total capacity relating to a particular resource, such as a percentage of CPU utilization, or CPU consumption, or Level 3 cache usage. However, metrics may correspond to other types of measures, such as how frequent one or more virtual machines 148 are reading and writing to memory.

Policy agents 205 may perform network infrastructure resource monitoring and analysis locally at each of servers 126. In some examples, policy agents 205 accumulate relevant data (e.g., telemetry data) captured by various devices/applications (e.g., sensors, probes, and/or the like), package the captured relevant data into a data model in accordance with a message protocol type, and communicate the packaged relevant data in a message flow. As described herein, some protocol types define dependencies in the data model between component(s) of two or more adjacent messages and their corresponding policy or policies require that the entire message flow be streamed to a same collector application for processing (e.g., in sequential order). Other protocol types may define zero (or a trivial number of) dependencies between component(s) of two or more adjacent messages such that a corresponding policy may require multiple collector applications operate in a distributed architecture for parallel processing at least a sub-sequence of messages in the message flow.

Policy agents 205 may send the messages in the message flow to a management computing system, which operates as an intermediary for these messages and any other message communicated to an analytics cluster within example data center 110. In some examples, the analytics cluster may operate substantially similar to the cluster illustrated in FIG. 1 with each computing system within the analytics cluster operating substantially similar to servers 126 of FIG. 1. The messages received by the analytics cluster transport relevant data associated with monitoring network infrastructure elements. From the relevant data, collector applications running within the analytics cluster may infer meaningful insights. In response to receiving such a message from one or more network devices of example data center 110, the management computing system may run a load balancing service to select a computing system of the analytics cluster as a destination server for receiving the message and then, communicate that message to the selected computing system. Running external to the analytics cluster, the load balancing service typically does not take any message's protocol type into consideration when identifying the computing system to receive the message.

In accordance with the policy enforcement techniques described herein, an ingress engine running in one or more or each computing system of the analytics cluster may receive a message and by taking into account the message's protocol type, may ensure that the message data is processed by an appropriate collector application. The ingress engine may apply to each message in a message flow each policy requirement corresponding to the message protocol type until the messages satisfies each requirement. Satisfying the policy may occur when a given message's data conforms to the protocol type's data model and becomes available for processing.

In one example, the ingress engine accesses various data (e.g., configuration data) to identify the appropriate collector application for receiving the message based upon the message's protocol type/data model. The appropriate collector application may be compatible with the message's protocol type/data model and assigned to the message flow. The ingress engine, in compliance with the corresponding policy requirements, may communicate the message to the appropriate collector application corresponding to the message's protocol type. This may further involve transforming the message into a compliant message, for example, by modifying message metadata or message payload data. In one example, the ingress engine inserts source information into the message header to ensure that the message data can be processed by the appropriate collector application.

In addition to identifying the appropriate collector application and communicating the message, the ingress engine may be configured to provide one or more collector applications scalability via load balancing, high availability, and auto-scaling. In one example, the ingress engine may respond to a failure at the appropriate collector application or in the collector application's computing system by communicating a message in the same message flow to a collector application running in a failover node of the same analytics cluster as the collector application's computing system. The collector application corresponds to the message's protocol type and is a replica of the appropriate collector application. In another example, the ingress engine of the computing system, creates one or more new instances of the appropriate collector application for receiving message data (e.g., telemetry data) of the protocol type. The ingress engine may communicate the message of the same message flow to the new instance running on the same computing system or communicating the message to the new instance running on a different computing system of the analytics cluster. In yet another example, if the ingress engine detects an excess load being processed by the appropriate collector application, the ingress engine may create a new instance to handle the excess load as long as it complies with the corresponding policy.

Figure 2:
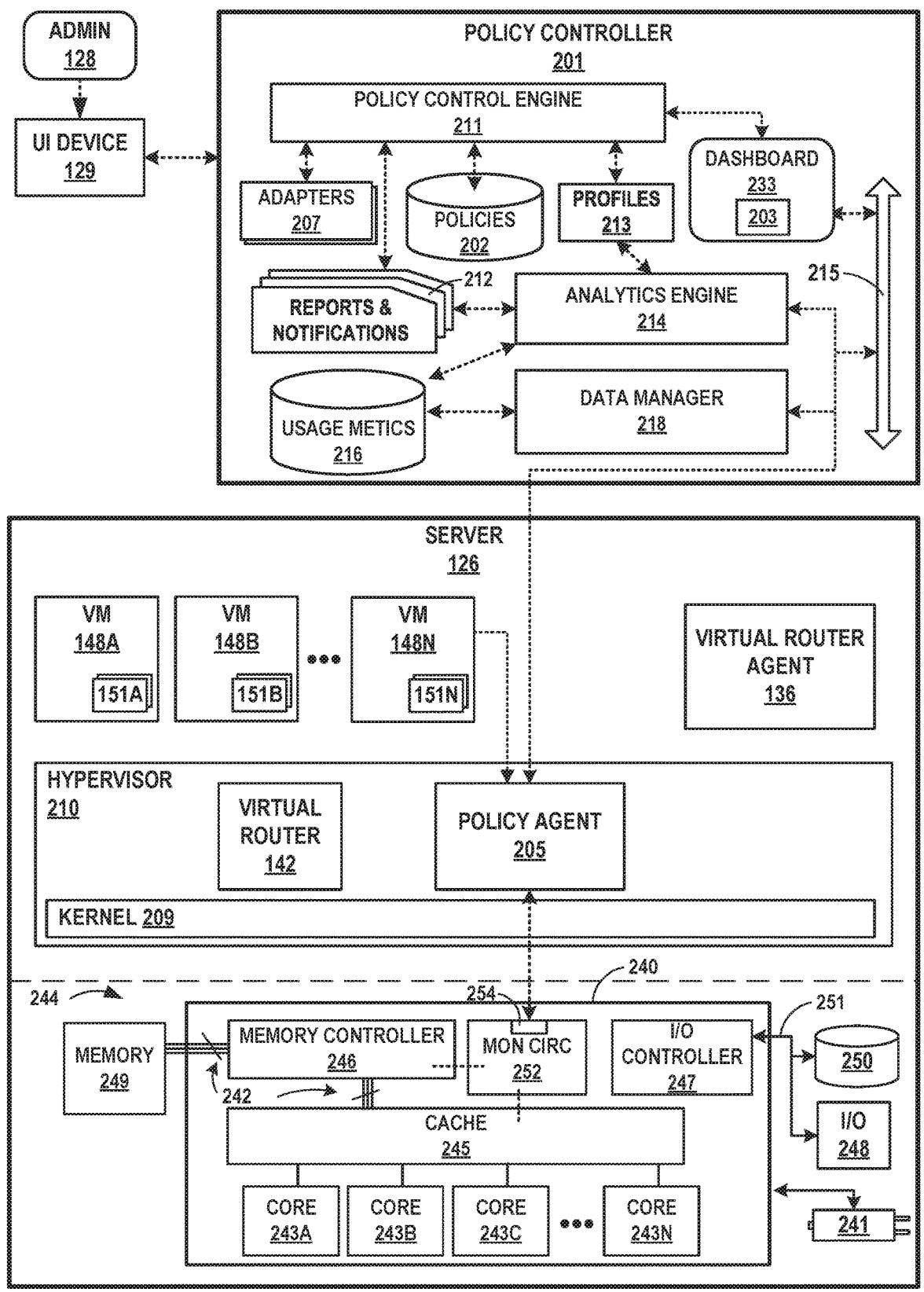
FIG. 2 is a block diagram illustrating a portion of the example data center of FIG. 1 in further detail, and in which resources are monitored with managed message load balancing with reordering consideration by an example server, in accordance with one or more aspects of the present disclosure.

FIG. 2 is a block diagram illustrating a portion of the example data center 110 of FIG. 1 in further detail, and in which internal processor metrics relating to resources shared by multiple processes executing on an example server 126 are monitored, in accordance with one or more aspects of the present disclosure. Illustrated in FIG. 2 are user interface device 129 (operated by administrator 128), policy controller 201, and server 126.

Policy controller 201 may represent a collection of tools, systems, devices, and modules that perform operations in accordance with one or more aspects of the present disclosure. Policy controller 201 may perform cloud service optimization services, which may include advanced monitoring, scheduling, and performance management for software-defined infrastructure, where containers and virtual machines (VMs) can have life cycles much shorter than in traditional development environments. Policy controller 201 may leverage big-data analytics and machine learning in a distributed architecture (e.g., data center 110). Policy controller 201 may provide near or seemingly near real-time and historic monitoring, performance visibility and dynamic optimization. Policy controller 201 of FIG. 2 may be implemented in a manner consistent with the description of policy controller 201 provided in connection with FIG. 1. Policy controller 201 may execute dashboard module 233, which creates, maintains, and/or updates dashboard 203. Dashboard 203 may include user interfaces that may include hierarchical network or virtualization infrastructure heat maps. Infrastructure elements within such user interfaces may be presented with a color or a range indicator that identifies a value range into which one or more utilization metrics associated with each infrastructure element can be categorized.

In FIG. 2, policy controller 201 includes policies 202 and dashboard module 233, as illustrated in FIG. 1. Policies 202 and dashboard 203 may also be implemented in a manner consistent with the description of policies 202 and dashboard 203 provided in connection with FIG. 1. In FIG. 2, dashboard 203 is created, updated, and/or maintained primarily by a dashboard module 233 executing on controller 201. In some examples, as illustrated in FIG. 2, policies 202 may be implemented as a data store. In such an example, policies 202 may represent any suitable data structure or storage medium for storing policies 202 and/or information relating to policies 202. Policies 202 may be primarily maintained by policy control engine 211, and policies 202 may, in some examples, be implemented through a NoSQL database.

In the example of FIG. 2, policy controller 201 of FIG. 2 further includes policy control engine 211, adapter 207, message bus 215, reports and notifications 212, analytics engine 214, usage metrics data store 216, and data manager 218.

Policy control engine 211 may be configured to control interaction between one or more components of policy controller 201, in accordance with one or more aspects of the present disclosure. For example, policy control engine 211 may administer policies 202 and control adapters 207. Policy control engine 211 may also cause analytics engine 214 to generate reports and notifications 212 based on data from usage metrics data store 216, and may deliver one or more reports and notifications 212 to user interface device 129 and/or other systems or components of data center 110.

In one example, policy control engine 211 invokes one or more adapters 207 to discover platform-specific resources and interact with platform-specific resources and/or other cloud computing platforms. For instance, one or more adapters 207 may include an OpenStack adapter configured to communicate with an OpenStack cloud operating system operating on servers 126. One or more adapters 207 may include a Kubernetes adapter configured to communicate with a Kubernetes platform on servers 126. Adapters 207 may further include an Amazon Web Services adapter, Microsoft Azure adapter, and/or a Google Compute Engine adapter. Such adapters may enable policy controller 201 to learn and map the infrastructure utilized by servers 126. Policy controller 201 may use multiple adapters 207 at the same time.

One or more reports may be generated for a specified time period, organized by different scopes: project, host or department. In some examples, such a report may show the resource utilization by each instance that is in a project or scheduled on a host. Dashboard 203 may include information presenting a report in graphical or tabular formats. Dashboard 203 may further enable report data to be downloaded as an HTML-formatted report, a raw comma-separated value (CSV) file, or an JSON-formatted data for further analysis.

Data manager 218 and message bus 215 provide a messaging mechanism for communicating with policy agents 205 deployed in servers 126. Data manager 218 may, for example, issue messages to configure and program policy agent 205, and may manage metrics and other data received from policy agents 205, and store some or all of such data within usage metrics data store 216. Data manager 218 may communicate with policy engine 211 over message bus 215.

Policy engine 211 may subscribe to information (e.g., metric information through a pub/sub messaging pattern) by interacting with data manager 218. In some cases, policy engine 211 subscribes to information by passing an identifier to data manager 218 and/or when making a call to an API exposed by data manager 218. In response, data manager 218 may place data on message bus 215 for consumption by data manager 218 and/or other components. Policy engine 211 may unsubscribe from receiving data from data manager over message bus 215 by interacting with data manager 218 (e.g., passing the identifier and/or making an API unsubscribe call).

Data manager 218 may receive, for example, raw metrics from one or more policy agents 205. Data manager 218 may, alternatively or in addition, receive results of analysis performed by policy agent 205 on raw metrics. Data manager 218 may, alternatively or in addition, receive information relating to patterns of usage of one or more input/output devices 248 that may be used to classify one or more input/output devices 248. Data manager 218 may store some or all of such information within usage metrics data store 216.

In the example of FIG. 2, server 126 represents a physical computing node that provides an execution environment for virtual hosts, such as VMs 148. That is, server 126 includes an underlying physical compute hardware 244 including one or more physical microprocessors 240, memory 249 such as DRAM, power source 241, one or more input/output devices 248, and one or more storage devices 250. As shown in FIG. 2, physical compute hardware 244 provides an environment of execution for hypervisor 210, which is a software and/or firmware layer that provides a lightweight kernel 209 and operates to provide a virtualized operating environments for virtual machines 148, containers, and/or other types of virtual hosts. Server 126 may represent one of servers 126 (e.g., server 126A through server 126N) illustrated in FIG. 1

In the example shown, processor 240 is an integrated circuit having one or more internal processor cores 243 for executing instructions, one or more internal caches or cache devices 245, memory controller 246, and input/output controller 247. Although in the example of FIG. 2 server 126 is illustrated with only one processor 240, in other examples, server 126 may include multiple processors 240, each of which may include multiple processor cores.

One or more of the devices, modules, storage areas, or other components of server 126 may be interconnected to enable inter-component communications (physically, communicatively, and/or operatively). For instance, cores 243 may read and write data to/from memory 249 via memory controller 246, which provides a shared interface to memory bus 242. Input/output controller 247 may communicate with one or more input/output devices 248, and/or one or more storage devices 250 over input/output bus 251.

In some examples, certain aspects of such connectivity may be provided through communication channels that include a system bus, a network connection, an inter-process communication data structure, or any other method for communicating data or control signals.

Within processor 240, each of processor cores 243A-243N (collectively "processor cores 243") provides an independent execution unit to perform instructions that conform to an instruction set architecture for the processor core. Server 126 may include any number of physical processors and any number of internal processor cores 243. Typically, each of processor cores 243 are combined as multi-core processors (or "many-core" processors) using a single IC (i.e., a chip multiprocessor).

In some instances, a physical address space for a computer-readable storage medium may be shared among one or more processor cores 243 (i.e., a shared memory). For example, processor cores 243 may be connected via memory bus 242 to one or more DRAM packages, modules, and/or chips (also not shown) that present a physical address space accessible by processor cores 243. While this physical address space may offer the lowest memory access time to processor cores 243 of any of portions of memory 249, at least some of the remaining portions of memory 249 may be directly accessible to processor cores 243.

Memory controller 246 may include hardware and/or firmware for enabling processor cores 243 to communicate with memory 249 over memory bus 242. In the example shown, memory controller 246 is an integrated memory controller, and may be physically implemented (e.g., as hardware) on processor 240. In other examples, however, memory controller 246 may be implemented separately or in a different manner, and might not be integrated into processor 240.

Input/output controller 247 may include hardware, software, and/or firmware for enabling processor cores 243 to communicate with and/or interact with one or more components connected to input/output bus 251. In the example shown, input/output controller 247 is an integrated input/output controller, and may be physically implemented (e.g., as hardware) on processor 240. In other examples, however, memory controller 246 may also be implemented separately and/or in a different manner, and might not be integrated into processor 240.

Cache 245 represents a memory resource internal to processor 240 that is shared among processor cores 243. In some examples, cache 245 may include a Level 1, Level 2, or Level 3 cache, or a combination thereof, and may offer the lowest-latency memory access of any of the storage media accessible by processor cores 243. In most examples described herein, however, cache 245 represents a Level 3 cache, which, unlike a Level 1 cache and/or Level2 cache, is often shared among multiple processor cores in a modern multi-core processor chip. However, in accordance with one or more aspects of the present disclosure, at least some of the techniques described herein may, in some examples, apply to other shared resources, including other shared memory spaces beyond the Level 3 cache.

Power source 241 provides power to one or more components of server 126. Power source 241 typically receives power from the primary alternative current (AC) power supply in a data center, building, or other location. Power source 241 may be shared among numerous servers 126 and/or other network devices or infrastructure systems within data center 110. Power source 241 may have intelligent power management or consumption capabilities, and such features may be controlled, accessed, or adjusted by one or more modules of server 126 and/or by one or more processor cores 243 to intelligently consume, allocate, supply, or otherwise manage power.

One or more storage devices 250 may represent computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor cores 243.

One or more input/output devices 248 may represent any input or output devices of server 126. In such examples, input/output devices 248 may generate, receive, and/or process input from any type of device capable of detecting input from a human or machine. For example, one or more input/output devices 248 may generate, receive, and/or process input in the form of physical, audio, image, and/or visual input (e.g., keyboard, microphone, camera). One or more input/output devices 248 may generate, present, and/or process output through any type of device capable of producing output. For example, one or more input/output devices 248 may generate, present, and/or process output in the form of tactile, audio, visual, and/or video output (e.g., haptic response, sound, flash of light, and/or images). Some devices may serve as input devices, some devices may serve as output devices, and some devices may serve as both input and output devices.

Memory 249 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 249 provides a physical address space composed of addressable memory locations. Memory 249 may in some examples present a non-uniform memory access (NUMA) architecture to processor cores 243. That is, processor cores 243 might not have equal memory access time to the various storage media that constitute memory 249. Processor cores 243 may be configured in some instances to use the portions of memory 249 that offer the lower memory latency for the cores to reduce overall memory latency.

Kernel 209 may be an operating system kernel that executes in kernel space and may include, for example, a Linux, Berkeley Software Distribution (BSD), or another Unix-variant kernel, or a Windows server operating system kernel, available from Microsoft Corp. In general, processor cores 243, storage devices (e.g., cache 245, memory 249, and/or storage device 250), and kernel 209 may store instructions and/or data and may provide an operating environment for execution of such instructions and/or modules of server 126. Such modules may be implemented as software, but may in some examples include any combination of hardware, firmware, and software. The combination of processor cores 243, storage devices within server 126 (e.g., cache 245, memory 249, and/or storage device 250), and kernel 209 may retrieve, store, and/or execute the instructions and/or data of one or more applications, modules, or software. Processor cores 243 and/or such storage devices may also be operably coupled to one or more other software and/or hardware components, including, but not limited to, one or more of the components of server 126 and/or one or more devices or systems illustrated as being connected to server 126.

Hypervisor 210 is an operating system-level component that executes on hardware platform 244 to create and runs one or more virtual machines 148. In the example of FIG. 2, hypervisor 210 may incorporate the functionality of kernel 209 (e.g., a "type 1 hypervisor"). In other examples, hypervisor 210 may execute on kernel 209 (e.g., a "type 2 hypervisor"). In some situations, hypervisor 210 may be referred to as a virtual machine manager (VMM). Example hypervisors include Kernel-based Virtual Machine (KVM) for the Linux kernel, Xen, ESXi available from VMware, Windows Hyper-V available from Microsoft, and other open-source and proprietary hypervisors.

In the example of FIG. 2, server 126 includes a virtual router 142 that executes within hypervisor 210, and may operate in a manner consistent with the description provided in connection with FIG. 1. In the example of FIG. 2, virtual router 142 may manage one or more virtual networks, each of which may provide a network environment for execution of virtual machines 148 on top of the virtualization platform provided by hypervisor 210. Each of the virtual machines 148 may be associated with one of the virtual networks.

Policy agent 205 may execute as part of hypervisor 210, or may execute within kernel space or as part of kernel 209. Policy agent 205 may monitor some or all of the performance metrics associated with server 126. According to the techniques described herein, among other metrics for server 126, policy agent 205 is configured to monitor metrics that relate to or describe usage of resources shared internal to processor 240 by each of processes 151 executing on processor cores 243 within multi-core processor 240 of server 126. In some examples, such internal processor metrics relate to usage of cache 245 (e.g., a L3 cache) or usage of bandwidth on memory bus 242. Policy agent 205 may also be capable of generating and maintaining a mapping that associates processor metrics for processes 151 to one or more virtual machines 148, such as by correlation with process identifiers (PIDs) or other information maintained by kernel 209. In other examples, policy agent 205 may be capable of assisting policy controller 201 in generating and maintaining such a mapping. Policy agent 205 may, at the direction of policy controller 201, enforce one or more policies 202 at server 126 responsive to usage metrics obtained for resources shared internal to a physical processor 240 and/or further based on other usage metrics for resources external to processor 240.

Virtual router agent 136 is included within server 126 in the example of FIG. 2. With reference to FIG. 1, virtual router agents 136 may be included within each of servers 126 (although not shown in FIG. 1). In the example of FIG. 2, virtual router agent 136 communicates with SDN controller 132 and, responsive thereto, directs virtual router 142 so as to control the overlay of virtual networks and coordinate the routing of data packets within server 126. In general, virtual router agent 136 communicates with SDN controller 132, which generates commands to control routing of packets through data center 110. Virtual router agent 136 may execute in user space and operate as a proxy for control plane messages between virtual machines 148 and SDN controller 132. For example, virtual machine 148A may request to send a message using its virtual address via virtual router agent 136, and virtual router agent 136A may in turn send the message and request that a response to the message be received for the virtual address of virtual machine 148A, which originated the first message. In some cases, virtual machine 148A may invoke a procedure or function call presented by an application programming interface of virtual router agent 136, and virtual router agent 136 handles encapsulation of the message as well, including addressing.

In some example implementations, server 126 may include an orchestration agent (not shown in FIG. 2) that communicates directly with orchestration engine 130. For example, responsive to instructions from orchestration engine 130, the orchestration agent communicates attributes of the particular virtual machines 148 executing on each of the respective servers 126, and may create or terminate individual virtual machines.

Virtual machine 148A, virtual machine 148B, through virtual machine 148N (collectively "virtual machines 148") may represent example instances of virtual machines 148. Server 126 may partition the virtual and/or physical address space provided by memory 249 and/or provided by storage device 250 into user space for running user processes. Server 126 may also partition virtual and/or physical address space provided by memory 249 and/or storage device 250 into kernel space, which is protected and may be inaccessible by user processes.

In general, each of virtual machines 148 may be any type of software application and each may be assigned a virtual address for use within a corresponding virtual network, where each of the virtual networks may be a different virtual subnet provided by virtual router 142. Each of virtual machines 148 may be assigned its own virtual layer three (L3) IP address, for example, for sending and receiving communications but is unaware of an IP address of the physical server on which the virtual machine is executing. In this way, a "virtual address" is an address for an application that differs from the logical address for the underlying, physical computer system, e.g., server 126A in the example of FIG. 1.

Each of virtual machines 148 may represent a tenant virtual machine running customer applications such as Web servers, database servers, enterprise applications, or hosting virtualized services used to create service chains. In some cases, any one or more of servers 126 (see FIG. 1) or another computing device hosts customer applications directly, i.e., not as virtual machines. Virtual machines as referenced herein (e.g., virtual machines 148), servers 126, or a separate computing device that hosts a customer application may be referred to alternatively as "hosts." Further, although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on servers 126.

Processes 151A, processes 151B, through processes 151N (collectively "processes 151") may each execute within one or more virtual machines 148. For example, one or more processes 151A may correspond to virtual machine 148A, or may correspond to an application or a thread of an application executed within virtual machine 148A. Similarly, a different set of processes 151B may correspond to virtual machine 148B, or to an application or a thread of an application executed within virtual machine 148B. In some examples, each of processes 151 may be a thread of execution or other execution unit controlled and/or created by an application associated with one of virtual machines 148. Each of processes 151 may be associated with a process identifier that is used by processor cores 243 to identify each of processes 151 when reporting one or more metrics, such as internal processor metrics collected by policy agent 205.

In operation, hypervisor 210 of server 126 may create a number of processes that share resources of server 126. For example, hypervisor 210 may (e.g., at the direction of orchestration engine 130) instantiate or start one or more virtual machines 148 on server 126. Each of virtual machines 148 may execute one or more processes 151, and each of those software processes may execute on one or more processor cores 243 within hardware processor 240 of server 126. For instance, virtual machine 148A may execute processes 151A, virtual machine 148B may execute processes 151B, and virtual machines 148N may execute processes 151N. In the example of FIG. 2, processes 151A, processes 151B, and processes 151N (collectively "processes 151") all execute on the same physical host (e.g., server 126) and may share certain resources while executing on server 126. For instance, processes executing on processor cores 243 may share memory bus 242, memory 249, input/output devices 248, storage device 250, cache 245, memory controller 246, input/output controller 247, and/or other resources.

Kernel 209 (or a hypervisor 210 that implements kernel 209) may schedule processes to execute on processor cores 243. For example, kernel 209 may schedule, for execution on processor cores 243, processes 151 belonging to one or more virtual machines 148. One or more processes 151 may execute on one or more processor cores 243, and kernel 209 may periodically preempt one or more processes 151 to schedule another of the processes 151. Accordingly, kernel 209 may periodically perform a context switch to begin or resume execution of a different one of the processes 151. Kernel 209 may maintain a queue that it uses to identify the next process to schedule for execution, and kernel 209 may place the previous process back in the queue for later execution. In some examples, kernel 209 may schedule processes on a round-robin or other basis. When the next process in the queue begins executing, that next process has access to shared resources used by the previous processes, including, for example, cache 245, memory bus 242, and/or memory 249.

Figure 3:
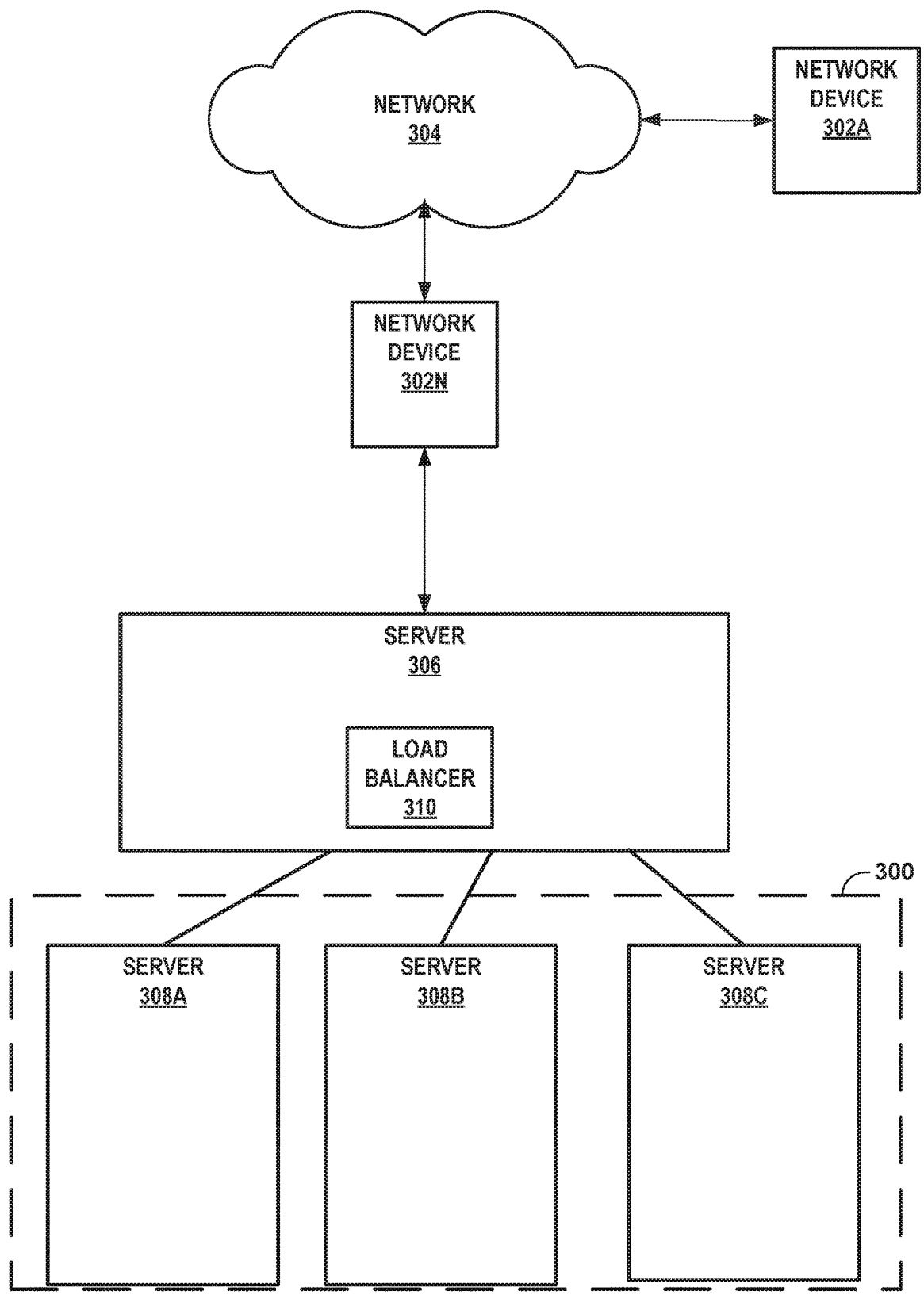
FIG. 3 is a block diagram illustrating an example analytics cluster for the example data center of FIG. 1, in accordance with one or more aspects of the present disclosure.

FIG. 3 is a block diagram illustrating an example analytics cluster 300 for example data center 110 of FIG. 1, in accordance with one or more aspects of the present disclosure.

In the illustrated example of FIG. 3, a plurality of network devices 302A-N (hereinafter "network devices 302") are connected to each other via network 304. Server 306 is a dedicated server generally operating as an intermediary device between network device 302 and analytics cluster 300 such that any communication (e.g., message) is first processed by an interface generated by a component of server 306. Message flows initiated by one or more network devices 302 may be directed to this interface and, in turn, server 306 distributes each message flow in accordance with one or more performance management services.

In server 306, load balancer 310 refers to a set of software programs that when executed on various hardware (e.g., processing circuitry), run the one or more performance management services. Load balancer 310 may coordinate various hardware/software components to enable network layer 2 load balancing (e.g., a layer 2 performance management micro-service) in analytics cluster 300; as one example, load balancer 310 and a software layer operating the interface may be configured to distribute the message flows in accordance with one or more policies. Load balancer 310 may maintain routing data to identify which one(s) of servers 308 are to receive messages in a given message flow based upon that message flow's protocol type.

A plurality of computing systems of analytics cluster 300 may run various applications in support of network infrastructure resource monitoring and management. The present disclosure refers to these computing systems as a plurality of servers 308A-C (hereinafter "servers 308") where each server 308 may be an example embodiment of server 126 of FIG. 1. Via server 306 as an entry point, network devices 302 may provide relevant data for resource monitoring and network infrastructure management. The various applications running on the servers 308 consume the relevant data, for example, by applying rules and generating information containing insights into the example data center. These insights provide meaningful information to improve network infrastructure resource monitoring and network management. As an example, an application may use the relevant data to assess a resource's health or risk and determine whether the resource is in good or bad health or is at-risk or low risk. Streaming the relevant data to analytics cluster 300 enables network administrators to measure trends in link and node utilization, and troubleshoot such issues as network congestion in real time. The streamed relevant data may include telemetry data such as physical interface statistics, firewall filter counter statistics, label-switched path (LSP) statistics.

While the above-mentioned computing system and other computing systems described herein are operative to perform the resource monitoring and network infrastructure management for the example data center, the present disclosure is applicable to any computing system having to follow a policy to determine how to manage an incoming message to ensure that the message's stored data is received and processed by an appropriate collector application. Even though messages involved in the present disclosure may be formatted in accordance with any structure, message components are typically formatted in accordance with a networking protocol; for example, some messages in accordance with a telemetry protocol store telemetry data for communication to a collector application running in a destination server amongst servers 308.

In each server 308, a plurality of collector applications process and store the relevant data for subsequent processing. Each collector application may be configured to receive messages in accordance with a protocol type a described herein where each example message may be arranged in a specific message format. Each compatible collector application may be operative to transform message data into viable datasets for use in network infrastructure resource monitoring and management. Each compatible collector application may arrange data to conform with one or more data models compatible with the protocol type (e.g., a telemetry protocol type). Based upon load balancer 310, server 308A, for instance, may be configured with compatible collector applications to receive relevant data in accordance with SNMP, Junos Telemetry Interface (JTI), and SYSLOG protocol types. For each protocol, server 308A may run a single compatible collector application or multiple compatible collector applications. Server 308A may run collector applications that are even more granular; for example, server 308A may run one or multiple collector applications configured to collect data for a specific version of a protocol type, such as separate collector applications for SNMP version 2 and version 3.

For a given protocol type, the present disclosure describes a set of requirements with which relevant data stored in a message or a sequence of messages is to be in compliance. As described herein, different network devices such as routers, switches, and/or the like provide different mechanisms (e.g., "telemetry protocols") for collecting the relevant data (e.g., performance telemetry data). To illustrate, SNMP, gRPC, JTI, and SYSLOG are examples of different telemetry protocols for exporting performance telemetry data. In addition, each telemetry protocol may have one or more unique requirements, for example, one or more requirements for controlling a (telemetry) data processing load at one or more computing systems of the analytics cluster. Example requirements may include maintaining a message load at or under a threshold (i.e., a maximum), regulating a size of a complete telemetry dataset and/or a rate (e.g., periodically or in bursts) at which telemetry data is communicated to and/or processed by one or more computing systems of the analytics cluster, regulating a size of a message (e.g., a size of message payload), and/or the like. There are a number of other requirements that may affect the load balancing micro-service for the analytics cluster. Another requirement may indicate the protocol's a sensitivity to message ordering/reordering or packet drops when the messages are delivered to the collector applications. In a cloud scale environment, these requirements make it challenging to load balance high bandwidth telemetry data across multiple collector applications while meeting each telemetry protocol requirements. The present disclosure introduces techniques for collecting telemetry data using UDP-based telemetry protocols, e.g. SNMP, JTI, and SYSLOG, for further processing and analysis while meeting the unique requirements for different telemetry protocols.

Examples of such performance telemetry data may be generated by sensors, agents, devices, and/or the like in the data center 110 and then, communicated to server 306 in message form. In servers 308, various applications analyze the telemetry data stored in each message and obtain statistics or some other meaningful information. Some network infrastructure elements (e.g., routers) in the data center 110 may be configured to communicate the telemetry data in message form to one or more destination servers.

Junos Telemetry Interface (JTI) sensors may generate telemetry data (e.g., Link State Path (LSP) traffic data, logical and physical interface traffic data) at network device 302N's forwarding component (e.g., a packet forwarding engine) and communicate probes through network device 302N's data plane. In addition to connecting the network device 302N's routing engine to server 306, a data port may be connected to server 306 or an appropriate collector application running on one of servers 308. Other network devices 302 may use server 306 to reach the appropriate collector application.

Techniques described herein directed to message management (e.g., distribution) not only enforce any policy but also ensure that an appropriate set of requirements is applied to an incoming message. One example set of requirements ensure the incoming message's data conforms to a data model prescribed by the message's protocol type. In this manner, efficient resource monitoring and network infrastructure management in the example data center may be enabled by different protocol types (e.g., including different versions) operating, more or less, simultaneously, despite having different requirements.

Figure 4A:
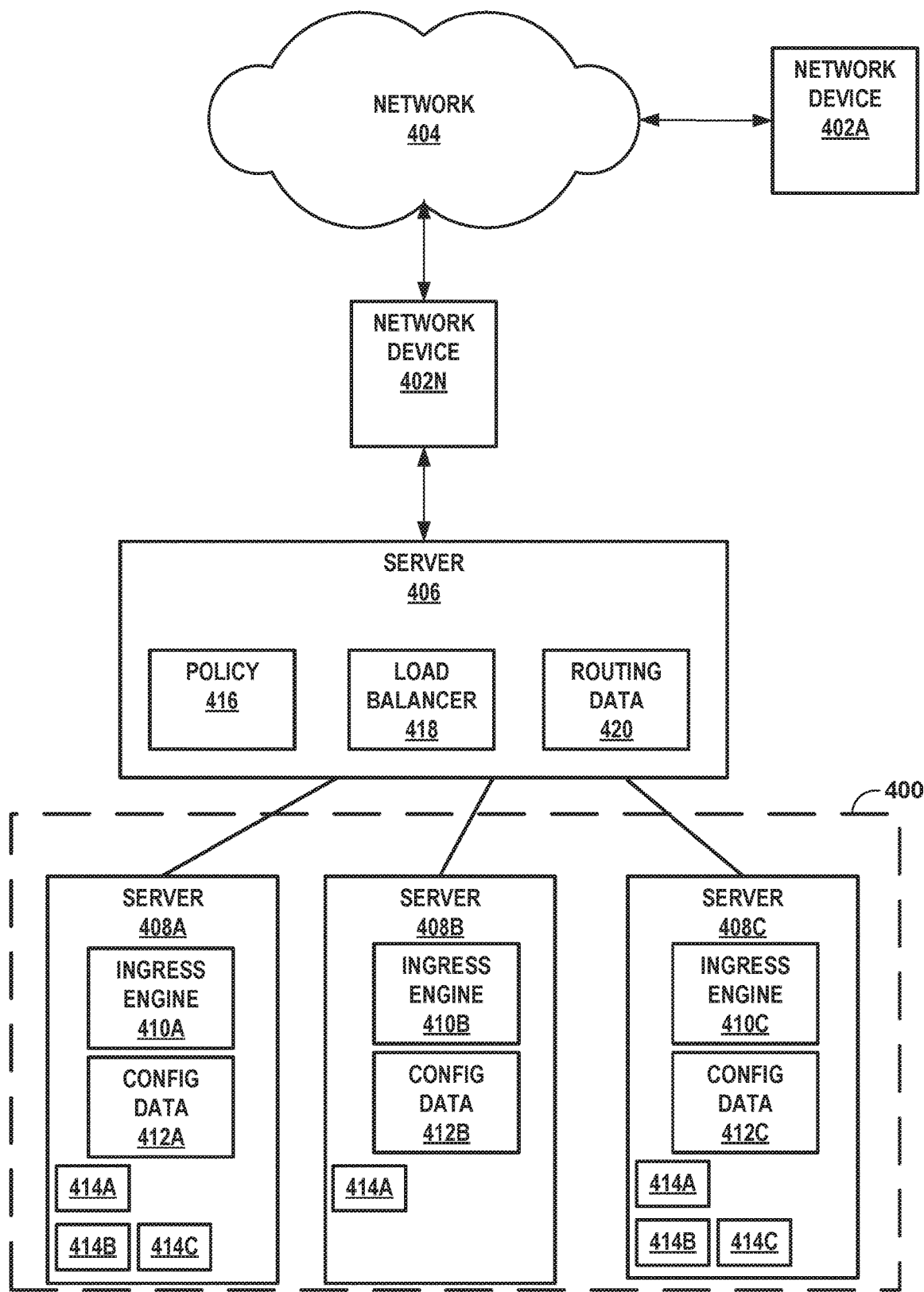
FIG. 4A is a block diagram illustrating an example configuration of an example analytics cluster in the example data center of FIG. 1, in accordance with one or more aspects of the present disclosure.

FIG. 4A is a block diagram illustrating an example configuration of an example analytics cluster in example data center 110 of FIG. 1, in accordance with one or more aspects of the present disclosure.

Similar to analytics cluster 300 of FIG. 3, analytics cluster 400 provides micro-services in support of network resource monitoring and network management for example data center 110 of FIG. 1. In example data center 110, a plurality of network devices 402A-N (hereinafter "network devices 402") are connected to each other via network 404. Network 404 generally represents various network infrastructure elements and a physical carrier medium to facilitate communications in the example data center. At least one network device, network device 402N, is communicably coupled via server 406 to analytics cluster 400, which is formed by a plurality of computing systems on which various applications support network resource monitoring and network management. The present disclosure refers to these computing systems as destination servers in a plurality of servers 408A-C (hereinafter "servers 408") for which server 406 provides load balancing services. Similar to server 306, server 406 operates as an entry point through which network devices 402 may provide messages transporting relevant data for resource monitoring and network infrastructure management. A number of applications running on the servers 408 consume the relevant data, for example, by applying rules and generating information containing insights into example data center 110.

Each of servers 408 includes a corresponding ingress engine of ingress engines 410A-C (hereinafter "ingress engines 410") and a corresponding one of configuration data 412A-C. A number of collector applications 414A-C (hereinafter "collector applications 414") running on the servers 408 consume the relevant data, for example, by applying rules and generating information containing insights into example data center 110. Each of ingress engines 410 generally refers to an execution element comprising various computing hardware and/or software that, in some instances, executes an example configuration stored in corresponding configuration data 412.

Example configuration data 412 for any given ingress engine 410 enables that ingress engine 410 to communicate message(s) of a particular protocol type to one or more appropriate collector applications corresponding to the particular protocol type in compliance with one or more requirements for data stored in such messages. For message data in accordance with the particular protocol type, example requirements for that data's viability may include session affinity, a proxy to modify message data, scalability, and/or the like. In view of these example requirements, example settings for the particular protocol may identify an appropriate collector application for each message sequence (e.g., flow), an attribute to push into a message header, a failover node in analytics cluster 400 for high availability, a threshold for load balancing and auto-scaling, and/or the like. Example configuration data 412 may further include an initial or default setting of a number of each protocol type's collector applications to run in a corresponding server for each ingress engine. Example configuration data 412 may identify which ones of the collector applications 414 is to process the data being provided by the network device, for instance, based upon the protocol type of the data.

To illustrate by way of example, in server 408A, configuration data 412A stores settings for a configuration of that server 408A in view of a corresponding set of requirements in policy 416. In general, these settings enable ingress engine 410A to properly manage incoming messages, for example, by maintaining an ordering of the incoming messages, providing scalability (i.e., load balance, auto-scaling, and high availability), and adding/maintaining source address information when sending the messages to one or more appropriate collector applications 414. Some example settings in configuration data 412A enable ingress engine 410A to identify which collector application(s) 414 in server 408A are appropriate to receive messages that are in accordance with a particular protocol type. Other settings indicate changes to specific message attributes, for example, in order to maintain a correct ordering of a sequence of messages. As described herein, by having a plurality of messages in the correct order, collector applications 414 and other applications in support of network resource monitoring and network management are able to assemble a complete dataset of the relevant data being transported in these messages.

Policy 416, as described herein, includes policy information for each protocol type or message type, and that policy information may be used to provide servers 408 with configuration data 412 for ingress engines 410. With respect to server 408A, configuration data 412A may identify collector application 414A for messages in accordance with SNMP, collector application 414B for messages in accordance with JTI, and collector application 414C for messages in accordance with SYSLOG. It should be noted that configuration data 412A may specify additional collector applications 414 including additional collectors for SNMP, SYSLOG, and JTI messages and one or multiple collectors for other protocol types.

Server 406 runs load balancer 418 as an execution element comprising various hardware and/or software. In one example, load balancer 418 executes a number of mechanisms to create and then, update routing data 420 with learned routes for directing messages to their destination servers in servers 408. Load balancer 418 may store, in routing data 420, routes that optimize performance by servers 408. Routing data 420 may indicate which one of servers 408 are to receive a specific sequence (e.g., flow) of messages, such as messages that are generated by a same network device or associated with a same source network address; these indications do not represent requirements for the relevant data that, if followed, prevent such data from being rendered useless. Instead, each ingress engine 410 is configured to enforce these requirements on relevant message data based upon the message protocol type.

To illustrate, server 406, in view of routing data 420, may communicate messages of a message flow to a specific server 408 and, in turn, a corresponding ingress engine 410 may communicate those messages to an appropriate collector application corresponding to the messages' protocol type in compliance that protocol type's requirements. The appropriate collector application may represent a same collector application for processing other messages of the same message flow, which may or may not be running on the specific server 408. Hence, the corresponding ingress engine 410 may communicate the messages to the appropriate collector application in a different server 408 even if a compatible collector application is running in the specific server 408.

Figure 4B:
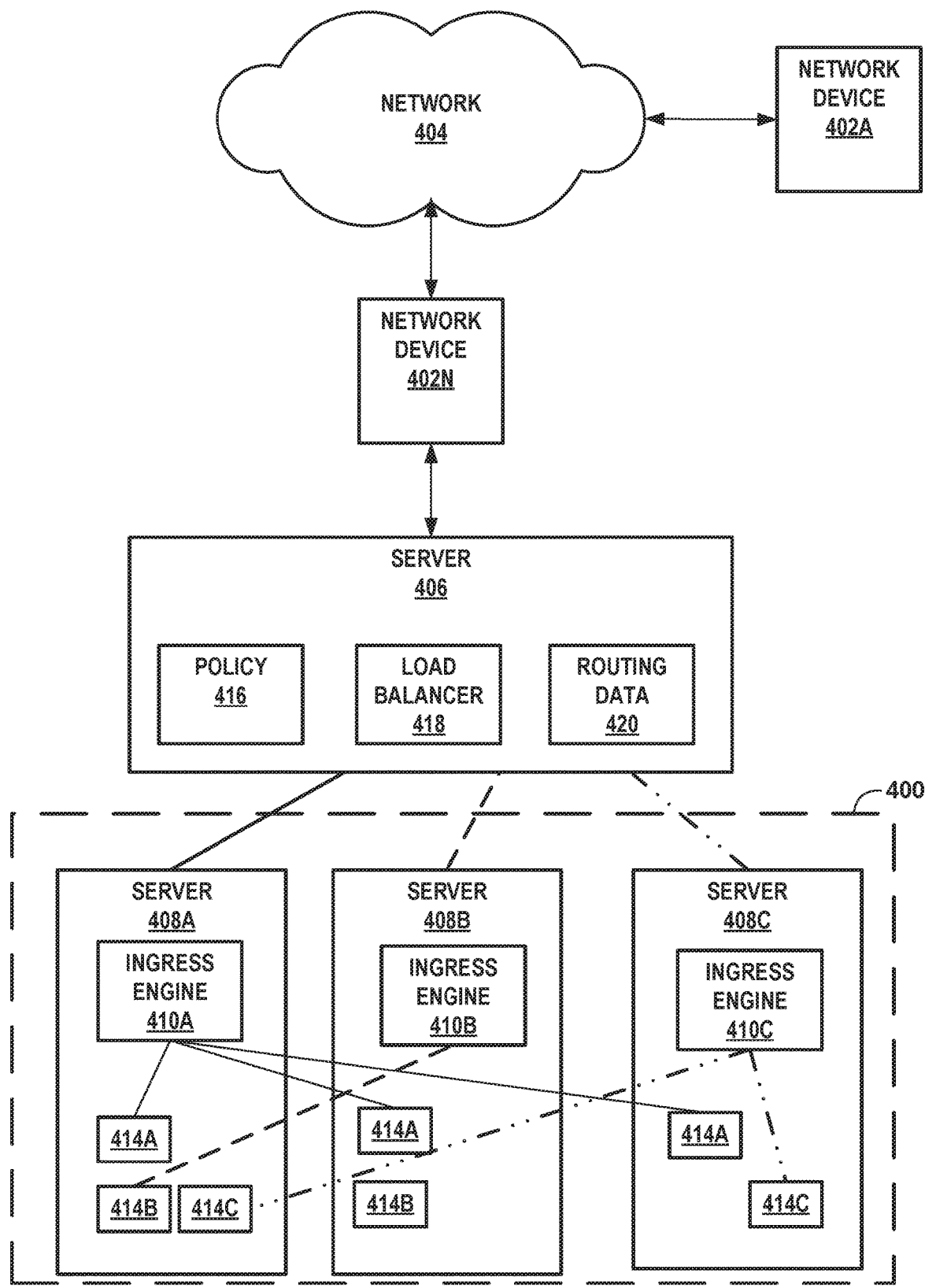
FIG. 4B is a block diagram illustrating example routing instances of the analytics cluster of FIG. 4A, in accordance with one or more aspects of the present disclosure.

FIG. 4B is a block diagram illustrating example routing instances in analytics cluster 400 of FIG. 4A, in accordance with one or more aspects of the present disclosure. When ingress engines 410 execute corresponding configuration data 412, the example routing instances result from paths traversed when communicating messages to appropriate collector applications 414. Hence, each example routing instance refers to a set of nodes forming the paths that deliver, to one or more destination servers amongst servers 408, each message belonging to a certain message protocol type.

Illustrated in FIG. 4B with solid lines, a first routing instance represents paths for messages that are arranged in accordance with a first protocol type. Policy 416, storing one or more requirements for message data in accordance with the first protocol type, may include an attribute indicating a high tolerance for reordering. This attribute may require multiple collector applications for processing the message data instead of a single dedicated collector application. Because of the high tolerance attribute, the multiple collector applications are not required to maintain message order (e.g., by coordinating message processing) and this, are free to process the messages in any order without rendering the relevant data useless.

Accordingly, when a sequence of messages carrying relevant telemetry data arrive at server 406, these messages are communicated to server 408A where ingress engine 410A identifies multiple collector applications 414A to receive/consume the relevant data (e.g., in any order). The messages may be distributed amongst multiple instances of collector application 414A where each instance receives a different portion of the relevant data to process (e.g., in parallel, in sequential order, or in any order). One example distribution of messages by ingress engine 410A may be to communicate every $i^{th}$ message in a subsequence of n messages to an $i^{th}$ collector application 414A running in servers 408. In FIG. 4A, ingress engine 410 communicates first, second, and third messages in each three message subsequence to respective collector applications 414A in servers 408A, 408B, and 408C. In other examples, a copy of each message is distributed amongst the multiple instances such that even if one copy becomes missing or some packets are dropped, collector application 414A is able to consume the relevant data and extract meaningful information in support of network resource monitoring and management.

Any collector application 414 running in servers 408 has the potential to fail, requiring a (failover) migration of messages a different collector application 414 and/or different server 408. To facilitate high availability in analytics cluster 400, ingress engine 410A may create a new instance of collector application 414A (i.e., a failover collector application 414A) in a same server 408A or in a different server 408B or 408C (i.e., a failover node). In response to a failure at server 408A, server 406 communicates a message to server 408B or 408C where corresponding ingress engines 410B or 410C further communicates the messages to the failover collector application 414A. In response to a failure of collector application 414A running at server 408A, ingress engine 410A may communicate the message to the failover collector application 414A and resume message processing. Hence, high availability is achieved by another server running the same collector application, so if the first server fails then message traffic can failover to the other server running the same type of collector application.

Maintaining failover nodes and applications provides a number of benefits. As an example, in case of failure, at least one instance of a compatible collector application is running on another server 408 in analytics cluster 400. As another benefit, if a message is lost or message data is corrupted, message processing proceeds with little or no disruption. Hence, failures do not interrupt analytics cluster 400. Messages arranged in accordance with the first protocol type may arrive out-of-order, corrupted, lost, and/or be dropped entirely during transmission and in most examples, the ingress engines of servers 408 should be able to obtain meaningful information even from an incomplete dataset.

A second routing instance (illustrated in FIG. 4B with dashed lines) results from enforcement of policy 416 for messages arranged in accordance with a second protocol type. Messages of the second protocol type are processed in order by a same collector application. According to policy 416 for the second protocol type, one or more requirements have to be followed because these messages have a low tolerance for reordering, otherwise meaningful information cannot be obtained or learned. One example requirement may be that only one collector application can process the messages in a message sequence. The second protocol type may conform to UDP transport protocol, which does not use sequence numbers to maintain message order. Examples of the second protocol type include UDP-based telemetry protocols (e.g., JTI) where session infinity is a requirement. Ingress engines 410 are configured to direct these messages to a specific instance of collector applications 414B, such as the one running on server 408A. Because analytics server 400 dedicates that specific instance of collector application 414B to process messages in a given flow (e.g., same source address, etc.) of the second protocol type. If any ingress engine other than ingress engine 410A receives such a message, that ingress engine (e.g., ingress engine 410B or 410C) promptly redirects that message to an appropriate collector application, as illustrated in FIG. 4B.

Configuration data 412B may provide an identifier, a memory address, or another piece of information describing how to access the specific instance of collector application 414B running on server 408A for the second protocol type. Because of configuration data 412B, ingress engine 410B of server 408B may be sufficiently programmed with instructions to properly redirect messages in accordance with the second protocol type. For example, ingress engine 410B may redirect to server 408A any message that is determined to be arranged in accordance with the second protocol type. FIG. 4B illustrates this redirection using the dashed line. While, in server 408B, another instance of collector application 414B may be running (as illustrated in FIG. 4B), policy 416 may still identify server 408A and/or a compatible collector application 414B running in server 408A to receive the messages from server 406.

Ingress engines 410 generally apply an incoming message's corresponding policy to determine which collector application(s) is/are appropriate. if a local appropriate collector application is unavailable, ingress engines 410 determine which servers 408 run appropriate collector application(s). In addition, the corresponding policy may specify one or more scalability requirements. For example, if a portion of a message flow in accordance with the second protocol type is communicated to collector application 414B running in server 408A, the second protocol type's policy may require that a same instance of collector application 414B receives one or more subsequent messages of the same message flow. Once an ordered set of messages is assembled at server 408A, at some point, a sufficient amount of relevant data may be collectible from data stored in the ordered set of messages. If that amount exceeds a threshold, a new instance of collector application 414B may be created to handle such an overflow. In case of a failure of collector application 414B in server 408A, ingress engine 410A migrates message processing to a failover instance of collector application 414B. Prior to the migration, ingress engine 410A may create the failover instance of collector application 414B in server 408A or another server 408. If, for any reason, a message is missing from the ordered set, information cannot be extracted from the stored data in the messages.

Load balancer 418 may be configured to maintain session affinity by communicating messages of a same message flow to a same server 408 where an instance of an appropriate collector application is running. Load balancer 418 stores a mapping between the same server 408 and the message flow in routing data 420 for server 406 to follow. Load balancer 418 may continue to send messages of the same flow to the same server 408, even if the appropriate collector application migrated (e.g., due to a failure) to another server 408. This may occur after migrating collector application 414B to server 408B and when load balancer 418 selects the same destination server (e.g., server 408B) for the same message flow arranged in accordance with the second protocol type.

To prevent message loss, a corresponding ingress engine 410B of server 408B may redirect a message to collector application 414B in server 408A.

A third routing instance is illustrated in FIG. 4B with dashed-and-dotted lines representing paths for messages in accordance with a third protocol type. For this routing instance, policy 416 may establish a proxy at each ingress engine to insert metadata into each message. As a requirement for any relevant data in these messages, policy 416 prescribes one or more collector applications 414C but leaves open how many collector applications 414C for ingress engine 410C to select for message processing. One example policy 416 requirement may identify collector application 414C as the appropriate collector but, at the same time, confer authority to ingress engine 410C for selecting or creating a replica collector application 414C to process messages. Ingress engine 410C may distribute these messages (e.g., in sequential order) amongst instances of collector application 414C running in server 408, including an instance in 408C and another instance in 408C.

As an alternative, ingress engine 410C may distribute the messages to multiple copies of collector application 414C running in server 408C. Even though FIG. 4B illustrates server 408C as having one copy of collector application 414C, other examples of server 408C may have multiple replicas and other servers 408 may have additional replicas. Any number of collector applications 414C may process the relevant data in these messages; by redistributing these messages amongst each other, a complete dataset of the relevant data in these messages may be assembled and processed.

Figure 4C:
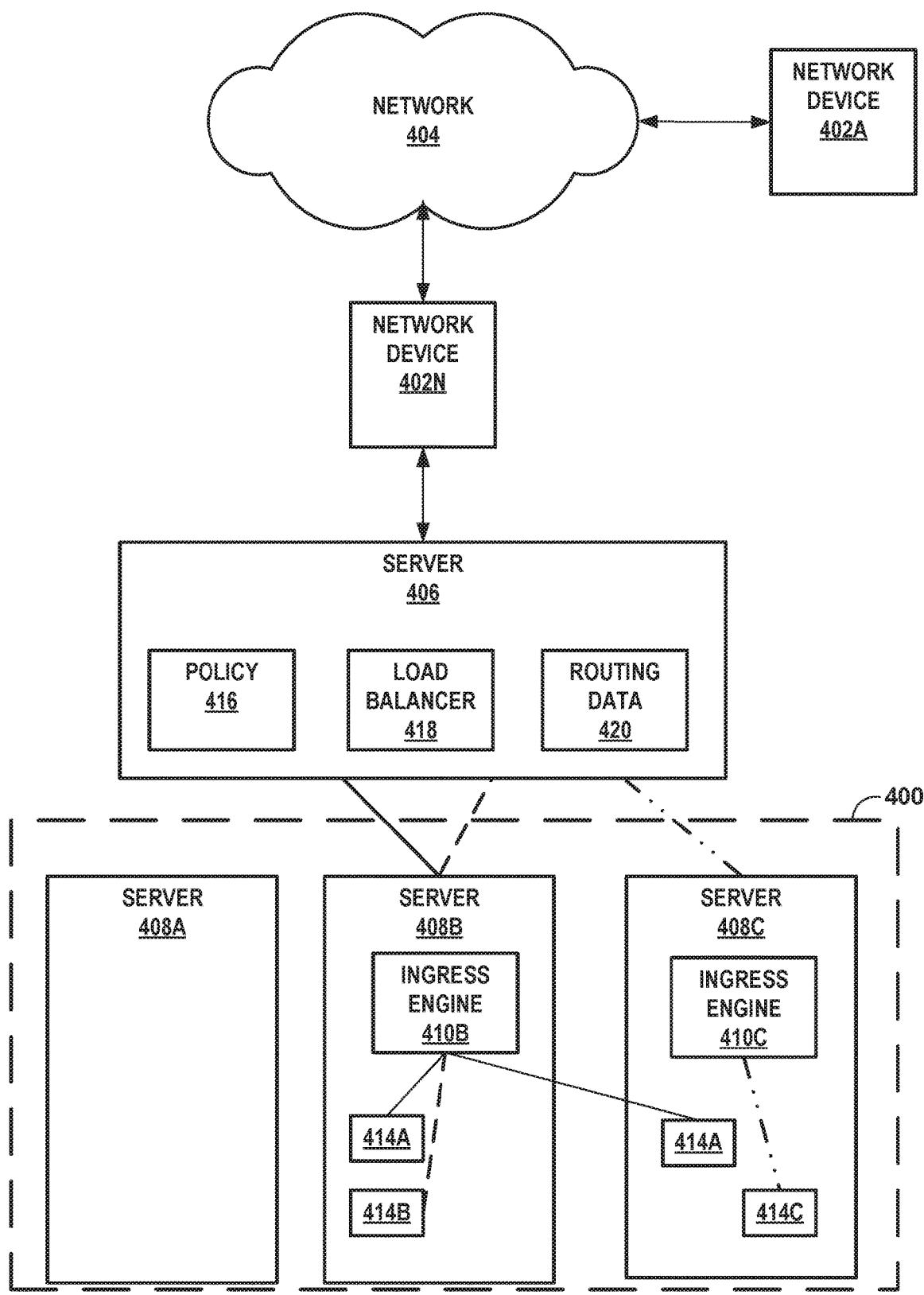
FIG. 4C is a block diagram illustrating an example failover of the example analytics cluster of FIG. 4A, in accordance with one or more aspects of the present disclosure.

FIG. 4C is a block diagram illustrating an example failover in analytics cluster 400 of FIG. 4A, in accordance with one or more aspects of the present disclosure. In general, the example failover refers a state (e.g., an operational state) in which analytics cluster 400, recognizing an inoperative destination server, leverages resources at one or more other destination servers to process messages originally destined for the inoperative destination server.

As illustrated in FIG. 4C, server 408A has a computing failure, becoming inoperative as a result; accordingly, if a message is communicated to that server 408A, the message will not arrive and may be lost altogether. Load balancer 418 is configured to ensure that analytics cluster 400 has high availability by redirecting these messages to another destination server amongst servers 408, ensuring that these messages are processed for relevant data. To replace the collector applications previously running in server 408A, ingress engine 410B and 410C may instantiate initial copies of these applications (if not already running) or instantiate additional copies of these applications in other servers 408. For instance, messages for the first protocol type (e.g., SYSLOG protocol type) may be redirected from server 408A to servers 408B and 408C, each having installed and running a copy of collector application 414A.

Messages in accordance with the second protocol type (e.g., a telemetry protocol such as JTI) can be redirected after a failure but doing so may run the risk of disrupting the telemetry data analysis and losing some insights for network infrastructure monitoring and management. Policy 416 for the second protocol type requires that these messages be processed in sequence order or at least some relevant telemetry data cannot be extracted for operational statistics and other meaningful information. Therefore, when a failure disrupts server 408A, server 408B may operate as a failover node and a new instance (e.g., a replica/copy) of collector application 414B may receive these messages and continue the telemetry data analysis. However, under certain circumstances, the telemetry data analysis may be disrupted because that message's protocol type requires that a same instance of collector application 414B receive the messages. For certain second protocol types (e.g., JTI), the new instance of collector application 414B may expect minimal message loss during a failover until a steady state is achieved. There may be other circumstances when the new instance of collector application 414B currently running on server 408B cannot process incoming messages in response to a failover on server 408A.

It should be noted that the present disclosure does not foreclose on providing high availability for messages of the second protocol type. In some examples, collector application 414B may be migrated to server 408B from server 408A even though the second protocol type demands in-order message processing. Even though policy 416 indicates a requirement to maintain an ordered sequence of messages, ingress engine 410B instantiates a second copy of collector application 414B in server 408B to handle these messages. Although not illustrated in FIG. 4C, multiple copies (e.g., replicas) of collector application 414B may be instantiated in server 408B. This may occur even if the first copy of collector application 414B already is running in server 408B. In one example, the first copy of collector application 414B does not have any previously communicated messages and, for at least this reason, cannot be used for incoming messages. In this manner, the first copy of collector application 414B is not overburdened with processing tasks and data collection continues uninterrupted for that first copy's messages. If, on the other hand, policy 416 requires messages arrive in order for processing at a same collector application 414B, the second copy of collector application 414B may be designated for that purpose after resetting or restarting the message sequence. Some protocol types satisfy this requirement while permitting a new instance to assume responsibility, for example, during a failover.

Figure 4D:
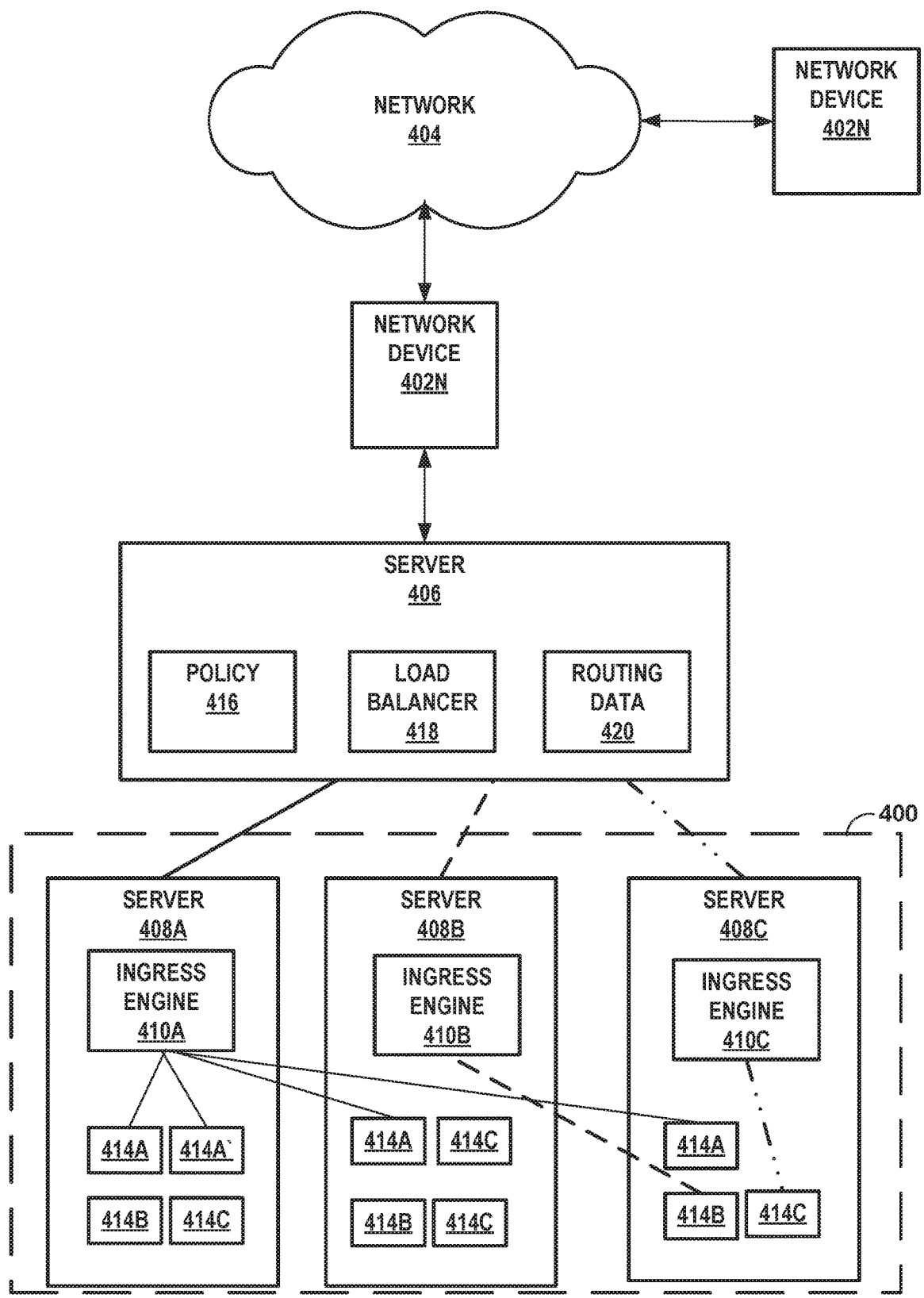
FIG. 4D is a block diagram illustrating an example auto-scaling operation in the example analytics cluster of FIG. 4A, in accordance with one or more aspects of the present disclosure.

FIG. 4D is a block diagram illustrating an example auto-scaling operation in analytics cluster 400 of FIG. 4A, in accordance with one or more aspects of the present disclosure.

In some examples, policy 416 dictates how or when load balancing is performed by any ingress engine 410 in servers 408. For messages of a SYSLOG protocol type, ingress engines 410 may load balance these messages across all the replicas of SYSLOG compatible collector application running in servers 408. For messages of a SNMP TRAP (e.g., version 2 or 3) protocol type, ingress engines 410 may load balance these messages across all the replicas of a SNMP TRAP compatible collector application. For messages of SNMP TRAP version 2, ingress engine(s) 410 may preserve source IP address, otherwise the source IP address can be overwritten by ingress engine(s) 410, to effectuate scalability across the replicas. Ingress engine(s) 410 with SNMP proxy(s) may ingest the source IP address to preserve this source information until UDP messages are received by the replicas. For JTI messages, neither load balancer 418 nor ingress engines 410 provide scalability because policy 416 for JTI sets forth a requirement that all incoming JTI compliant messages from a same source IP address be routed to a same replica of an appropriate collector application. To maintain session affinity for JTI messages, ingress engine(s) 410 are precluded from routing these messages to a different replica even if that replica also is a compatible instance of the same collector application.

For example, a SYSLOG message storing telemetry data is communicated to at least server 408A for processing by collector application 414A. Ingress engine 410A of server 408A, in response to receiving that SYSLOG message, may create a new instance of collector application 414A (e.g., a replica collector application 414A') for receiving the telemetry data stored in messages of the SYSLOG protocol type. In addition to or instead of communicating the messages to the previous instance of collector application 414A, Ingress engine 410A may communicate the messages to the new instance, replica 414', and/or communicate the messages to a new instance of collector application 414A running on a different computing system.

In some examples, in response to determining an overload at one or more of servers 408, a corresponding ingress engine 410 may analyze network traffic and identify one or more new collector applications to instantiate based upon that analysis. The corresponding ingress engine 410 may determine which protocols types are being used to format a majority of the messages in the network traffic and then, instantiate replicas of appropriate collector applications to handle these messages. If mostly JTI messages are received by analytics cluster 400, corresponding ingress engine 410 creates multiple new instances of appropriate collector application 414B in multiple destination servers 408. In other examples, policy 416 dictates when corresponding ingress engine 410 performs load balancing amongst multiple destination servers 408.

Figure 5:
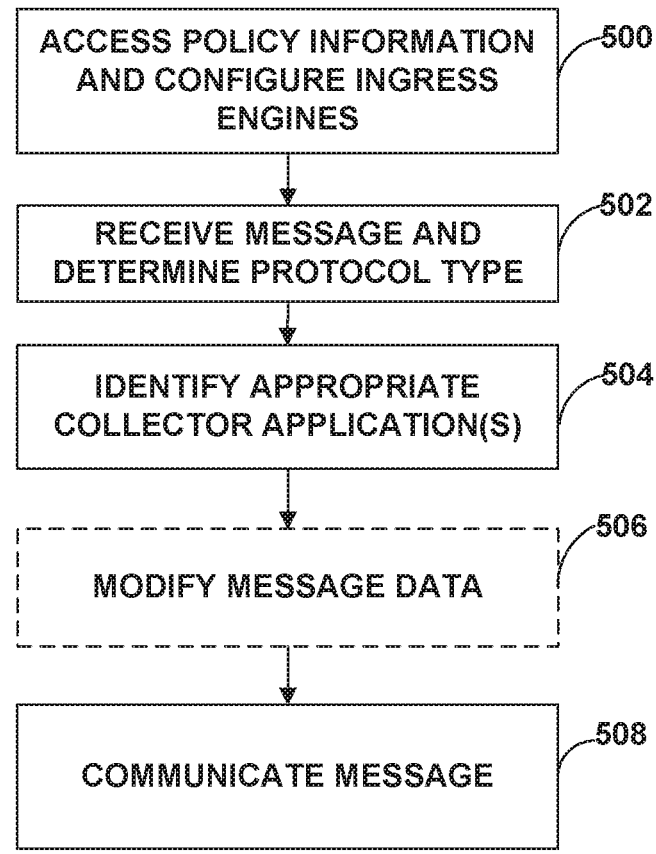
FIG. 5 is a flowchart illustrating an example operation of a computing system in the example analytics cluster of FIG. 4, in accordance with one or more aspects of the present disclosure.

FIG. 5 is a flowchart illustrating an example operation of a computing system in the example analytics cluster of FIGS. 4A-4D, in accordance with one or more aspects of the present disclosure. FIG. 5 is described below within the context of server 406 of FIG. 4B, which itself is an example of server 126 of FIG. 1 and is a computing system that may be deployed in analytics cluster 400 of FIGS. 4A-D. In other examples, operations described in FIG. 5 may be performed by one or more other components, modules, systems, or devices. Further, in other examples, operations described in connection with FIG. 5 may be merged, performed in a difference sequence, or omitted.

In the example of FIG. 5, and in accordance with one or more aspects of the present disclosure, processing circuitry of server 406 accesses policy information (e.g., policy 416) and configures each ingress engine 410 running in servers 408 of analytics cluster 400 based upon the policy information (500). Based upon the policy information for analytics cluster 400, collector applications are distributed amongst servers 408 of analytics cluster 400 and are configured to receive messages from network devices of the example data center 110 and then, process data stored in these messages. Messages communicated from the network devices arrive at server 406, which may or may not route these messages to an appropriate destination server running a compatible collector application to process the data stored in these messages. The policy information comprises one or more requirements for the data stored in messages to be considered valid and/or sufficient for analytics purposes.

The policy information in any example policy as described herein generally includes one or more requirements for data stored in messages corresponding to a particular networking protocol type. One example requirement in the policy information determines, based upon a protocol type for stored message data, one or more servers 408 to receive messages in accordance with that protocol type. Demonstrating compliance with each requirement ensures that the stored message data is a viable dataset for network resource monitoring and management. Some requirements ensure compliance with the particular networking protocol type of the messages, which may be a type of UDP-based telemetry protocol (e.g., JTI, SYSLOG, SNMP TRAP versions 2 and 3, and/or the like) or a type of another class of networking protocols. The particular network protocol may belong to a grouping of protocols, such as a group including any protocol type without a reordering mechanism. Because a message can correspond to more than one networking protocol type, some example policies define two or more sets of requirements for different networking protocols, such as a set of requirements to ensure compliance with a telemetry protocol and a second set of requirements to ensure compliance with a transport protocol. As another example, based upon the protocol type, the policy information identifies which collector application(s) is/are appropriate to receive certain messages in case of a migration event such as a failover or a load balancing. The protocol type may also establish an auto-scaling threshold for determining when to create new instances or destroy old instances of an appropriate collector application.

As described herein, the analytics cluster 400 may provide micro-services for example data center 110 and some micro-services involve implementing the example policy to direct the reordering of messages for network resource monitoring and network management. Policy controller 201 may define one or more policies for example data center 110 including the above-mentioned policy regarding message reordering. For example, user interface device 129 may detect input, and output to policy controller 201 an indication of input. Policy control engine 211 of policy controller 201 may determine that the input corresponds to information sufficient to define one or more policies. Policy control engine 211 may define and store one or more policies in policies data store 202. Policy controller 201 may deploy one or more policies to one or more policy agents 205 executing on one or more servers 126. In one example, policy controller 201 deploys one or more of the example policies to policy agent 205 executing on server 126 (e.g., server 406).

Server 406 as described herein may receive a message and, based upon the message's header and (possibly) other attributes, determine a destination server corresponding to that message's flow. Processing circuitry of server 406 identifies one of servers 408 as the destination server based upon routing data 420 and then, communicates the message to the identified destination server 408. In turn, a corresponding ingress engine 410 running on processing circuitry of the identified destination server 408 receives the message and determines the protocol type (502).

The corresponding ingress engine 410 of the identified destination server 408 identifies one or more appropriate collector applications for processing the message (504). The identified destination server 408 may identify the applications based upon the policy information for the protocol type. If the policy information requires a same collector application for receiving an ordered set of messages, corresponding ingress engine 410 of the identified destination server 408 may communicate the message to (an instance of) that collector application running on the identified destination server 408 or on a different second destination server 408.

If the policy information indicates a high tolerance for reordering and no requirement for messages to arrive at a same collector application, processing circuitry of server 406 may load balance messages of the same protocol type and from the same flow (i.e., having the same source address) across multiple collector applications running in the servers 408.

Ingress engine(s) 410 of server(s) 408, as an option, may modify message data (506). Such a modification may or may not be in compliance with the policy information for the protocol type. SNMP TRAP version 2, an example protocol type, may accept reordering of packets, however, a source IP address in each packet (e.g., packet header) needs to be preserved otherwise it may be overwritten by the ingress engine 410. When ingress engine(s) 410 receives SNMP TRAP version 2 packetized data, to preserve the source IP address, the ingress engines 410 insert that address into each packet (e.g., UDP packet) and those packets are communicated to the appropriate collector application.

Ingress engine(s) 410 of server(s) 408 communicate the message to one or more appropriate collector applications (508). Each appropriate collector application corresponding to the message's protocol type complies with at least one requirement of the policy information. As described herein, in response to receiving the message from the network device in the data center 110, ingress engine(s) 410 may determine whether the message complies with the at least one requirement for data stored in the message. If the policy information indicates a high tolerance for reordering for the message's protocol type, ingress engine(s) 410 communicates the message to a specific one of multiple appropriate collector applications. In compliance with the policy information, ingress engine(s) 410 distributes the messages amongst the multiple appropriate collector applications such that each application processes different messages of a same message flow. In some examples, ingress engine(s) 410 communicates the message to a same instance of a same collector application as other messages of same protocol type and message flow.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method, comprising:
    receiving, by an ingress engine running on processing circuitry of a computing system, a first plurality of messages from a network device in a data center comprising a plurality of network devices and the computing system, wherein the first plurality of messages comprises data configured according to a first protocol type, wherein the first protocol type has a high tolerance for reordering of messages;
    receiving, by the ingress engine, a second plurality of messages from the network device in the data center, wherein the second plurality of messages comprises data configured according to a second protocol type, wherein the second protocol type has a low tolerance for reordering of messages;
    in response to receiving the first plurality of messages from the network device in the data center, communicating, by the ingress engine, messages of the first plurality of messages across multiple appropriate collector applications compatible with the first protocol type; and
    in response to receiving the second plurality of messages from the network device in the data center, communicating, by the ingress engine, messages of the second plurality of messages to a single appropriate collector application compatible with the second protocol type,
    wherein each appropriate collector application of the single appropriate collector application and the multiple collector applications is configured to assemble at least the data in the received messages into a viable dataset for an analysis of at least the network device of the plurality of network devices.

2. The method of claim 1, wherein the computing system comprises a first computing system, and wherein communicating, by the ingress engine of the computing system, the second plurality of messages further comprises communicating, by the ingress engine, the second plurality of messages to the single appropriate collector application running in a second computing system.

3. The method of claim 1, wherein communicating, by the ingress engine of the computing system, the second plurality of messages further comprises communicating the second plurality of messages to the single appropriate collector application running in the computing system, wherein the single appropriate collector application receives other messages having the second protocol type.

4. The method of claim 1, wherein the single appropriate collector application receives other messages having the second protocol type.

5. The method of claim 1, wherein communicating, by the ingress engine, the second plurality of messages further comprises communicating, by the ingress engine, the second plurality of messages to a failover collector application running in a failover node of a same cluster as the computing system, wherein the failover collector application corresponds to the second protocol type and is a replica of the single appropriate collector application.

6. The method of claim 1, wherein communicating, by the ingress engine of the computing system, the second plurality of messages further comprises identifying the single appropriate collector application as a collector application configured to process, in accordance with the second protocol type, the data in the second plurality of messages.

7. The method of claim 1 further comprises:
    creating, by the ingress engine, a new instance of the single appropriate collector application for receiving data in messages of the second protocol type; and
    at least one of communicating, by the ingress engine of the computing system, the second plurality of messages to the new instance running on the computing system or communicating, by the ingress engine of the computing system, the second plurality of messages to the new instance running on a different computing system.

8. The method of claim 1, wherein communicating, by the ingress engine of the computing system, the second plurality of messages further comprises communicating, by a load balancer of a server communicably coupled to the computing system, the second plurality of messages to a second ingress engine running on a second computing system, wherein the second ingress engine redirects the second plurality of messages to the ingress engine running in the computing system.

9. The method of claim 1, wherein communicating, by the ingress engine of the computing system, a message of the second plurality of messages further comprises modifying a message header prior to communicating the message of the second plurality of messages to the single appropriate collector application.

10. The method of claim 1, wherein the single appropriate collector application is in compliance with at least one requirement for messages of the second protocol type, and wherein communicating, by the ingress engine, the second plurality of messages further comprises based upon a determination how to manage the second plurality of messages based upon the at least one requirement, communicating, by the ingress engine, the second plurality of messages to the single appropriate collector application corresponding to the second protocol type.

11. The method of claim 1, wherein the single appropriate collector application is in compliance with at least one requirement for messages of the second protocol type, the method further comprising generating, by processing circuitry of a server communicably coupled to the computing system, configuration data based upon a policy for the protocol type, wherein the policy indicates the at least one requirement for the second plurality of messages, wherein the configuration data identifies the single appropriate collector application for receiving the second plurality of messages.

12. The method of claim 1, wherein the single appropriate collector application is in compliance with at least one requirement for messages of the second protocol type, and wherein communicating, by the ingress engine, the second plurality of messages further comprises determining, by the ingress engine, whether the second plurality of messages complies with the at least one requirement for the message by accessing configuration data comprising a number of collector applications running in the computing system for the ingress engine and the at least one requirement for the second plurality of messages of the second protocol type that are communicated from one or more network devices to the computing system, wherein the at least one requirement identifies the single appropriate collector application that corresponds to the second protocol type.

13. The method of claim 1, wherein the multiple appropriate collector applications run in multiple computing systems of an analytics cluster.

14. A computing system, comprising:
a memory; and
processing circuitry in communication with the memory, the processing circuitry configured to execute logic comprising an ingress engine configured to:
receive a first plurality of messages from a network device in a data center comprising a plurality of network devices and the computing system, wherein the first plurality of messages comprises data configured according to a first protocol type, wherein the first protocol type has a high tolerance for reordering of messages comprising data;
receive a second plurality of messages from the network device, wherein the second plurality of messages comprises data configured according to a second protocol type, wherein the second protocol type has a low tolerance for reordering of messages comprising data;
in response to receiving the first plurality of messages from a network device in the data center, communicate messages of the first plurality of messages across multiple appropriate collector applications compatible with the first protocol type; and
in response to receiving the second plurality of messages from the network device in the data center, communicate messages of the second plurality of messages to a single appropriate collector application compatible with the second protocol type,
wherein each appropriate collector application of the single appropriate collector application and the multiple collector applications is configured to assemble at least the data in the received messages into a viable dataset for an analysis of at least the network device of the plurality of network devices.

15. The computing system of claim 14, wherein the ingress engine uses configuration data to identify, based upon the second protocol type, an instance of the single appropriate collector application running in at least one of the computing system or a different computing system.

16. The computing system of claim 14, wherein in response to a failure, the ingress engine redirects the second plurality of messages to a failover appropriate collector application running in a failover node that is communicably coupled to the computing system.

17. The computing system of claim 14, wherein the single appropriate collector application is in compliance with at least one requirement for messages of the second protocol type and wherein the ingress engine modifies the second plurality of messages to comply with the one or more requirements.

18. The computing system of claim 14, wherein the computing system operates as a failover node for at least one second computing system in a same cluster, wherein at least one of a server communicably coupled to the computing system or a second ingress engine running in a second computing system communicates the second plurality of messages to the computing system in response to a failure at the appropriate collector application.

19. The computing system of claim 14, wherein the multiple appropriate collector applications run in multiple computing systems of an analytics cluster.

20. A non-transitory computer-readable medium comprising instructions for causing a programmable processor to:
receive, by an ingress engine running on processing circuitry of a computing system, a first plurality of messages from a network device in a data center comprising a plurality of network devices and the computing system, wherein the first plurality of messages comprises data configured according to a first protocol type, wherein the first protocol type has a high tolerance for reordering of messages comprising data;
receive, by the ingress engine, a-second-plurality of messages from the network device, wherein the second plurality of messages comprises data configured according to a second protocol type, wherein the second protocol type has a low tolerance for reordering of messages comprising data;
in response to receiving the first plurality of messages from the network device in the data center, communicate the messages of the first plurality of messages across multiple appropriate collector applications compatible with the first protocol type; and
in response to receiving the second plurality of messages from the network device in the data center, communicate, by the ingress engine, messages of the second plurality of messages to a single appropriate collector application compatible with the second protocol type, wherein each appropriate collector application of the single appropriate collector application and the multiple collector applications is configured to assemble at least the data in the received messages into a viable dataset for an analysis of at least the network device of the plurality of network devices.

* * * * *